US011951481B2

(12) United States Patent
Wu

(10) Patent No.: US 11,951,481 B2
(45) Date of Patent: Apr. 9, 2024

(54) APPARATUSES AND METHODS FOR OPERATING A DIGITAL MICROFLUIDIC DEVICE

(71) Applicant: Digital BioSystems, Menlo Park, CA (US)

(72) Inventor: Chuanyong Wu, Menlo Park, CA (US)

(73) Assignee: Digital BioSystems, Menlo Park, CA (US)

( * ) Notice: Subject to any disclaimer, the term of this patent is extended or adjusted under 35 U.S.C. 154(b) by 0 days.

(21) Appl. No.: 17/950,884

(22) Filed: Sep. 22, 2022

(65) Prior Publication Data

US 2023/0022939 A1 Jan. 26, 2023

Related U.S. Application Data

(63) Continuation of application No. 16/540,878, filed on Aug. 14, 2019, now abandoned.

(60) Provisional application No. 62/718,853, filed on Aug. 14, 2018.

(51) Int. Cl.
*B01L 3/00* (2006.01)
*B01L 7/00* (2006.01)

(52) U.S. Cl.
CPC ........... *B01L 3/502784* (2013.01); *B01L 7/52* (2013.01); *B01L 2200/143* (2013.01); *B01L 2300/0663* (2013.01); *B01L 2300/18* (2013.01); *B01L 2400/043* (2013.01)

(58) Field of Classification Search
CPC ..... B01L 2200/0642; B01L 2200/0605; B01L 2300/089; B01L 2300/0816; B01L 2300/0867; B01L 3/502792; B01L 2400/02; B01L 2400/0487; B01L 2200/143; B01L 2400/0688; B01L 3/502715; B01L 2200/027; B01L 2400/0427; B01L 2200/0673; B01L 2200/0684
See application file for complete search history.

(56) References Cited

U.S. PATENT DOCUMENTS

2016/0301157 A1* 10/2016 Schwalbach ......... H04B 1/3833
2017/0056887 A1* 3/2017 Hadwen ............... G01N 33/579

* cited by examiner

*Primary Examiner* — Shogo Sasaki
(74) *Attorney, Agent, or Firm* — K&L Gates LLP; Louis C. Cullman; Giorgios N. Kefallinos

(57) ABSTRACT

Described herein are apparatuses and methods for the processing and/or measurements of chemical or biochemical samples on a digital microfluidic device. Also described are methods to configure and operate the modules for efficient processing and measurements of the samples on the device. The apparatus can be used in applications such as DNA/RNA/protein/cell concentration/purification, real-time PCR, isothermal amplification, immunoassay, cell-based assay, library preparation for NGS sequencing, etc.

19 Claims, 11 Drawing Sheets

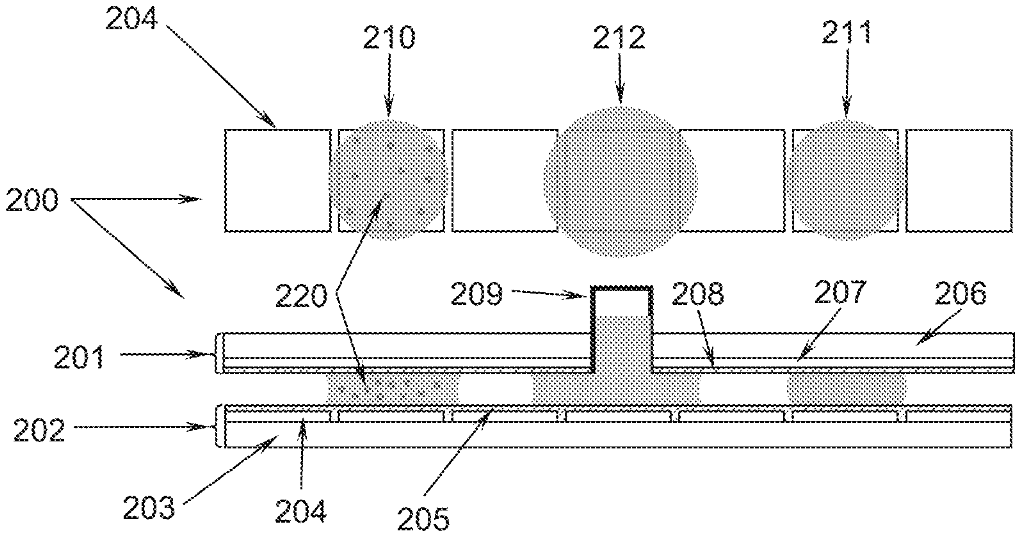
Fig. 2A
Fig. 2B
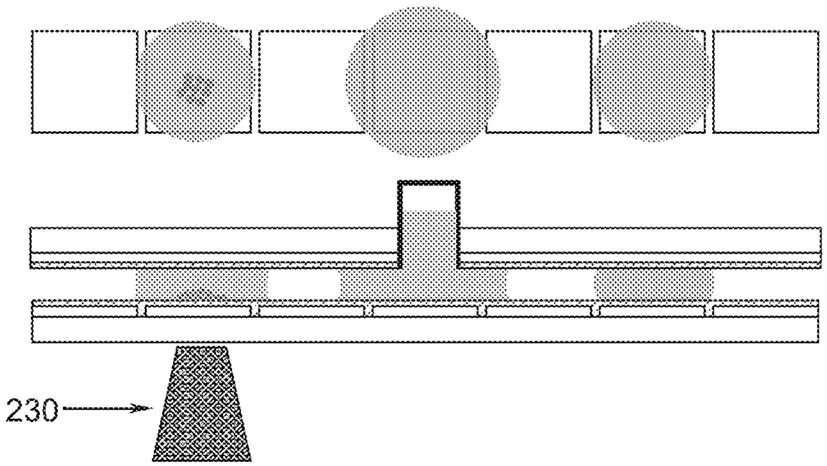
Fig. 2C
Fig. 2D
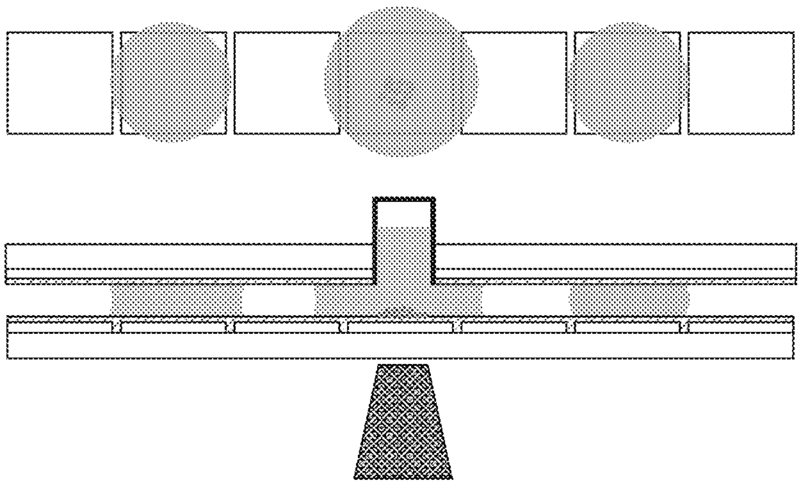
Fig. 2E
Fig. 2F

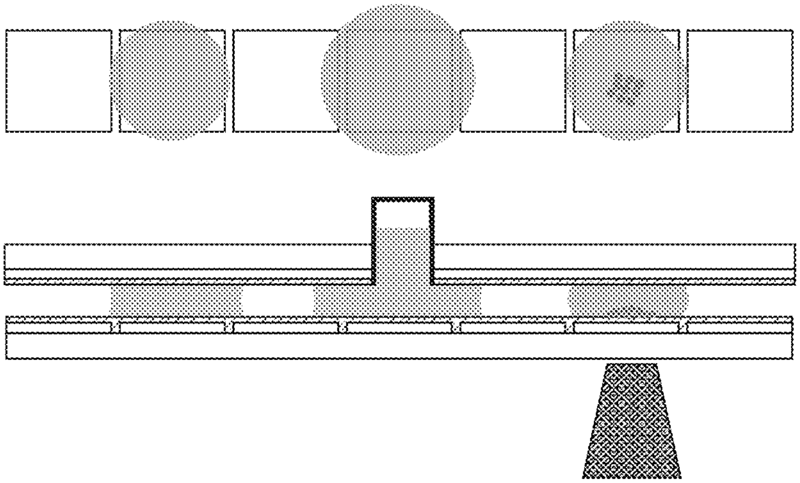
Fig. 2G
Fig. 2H
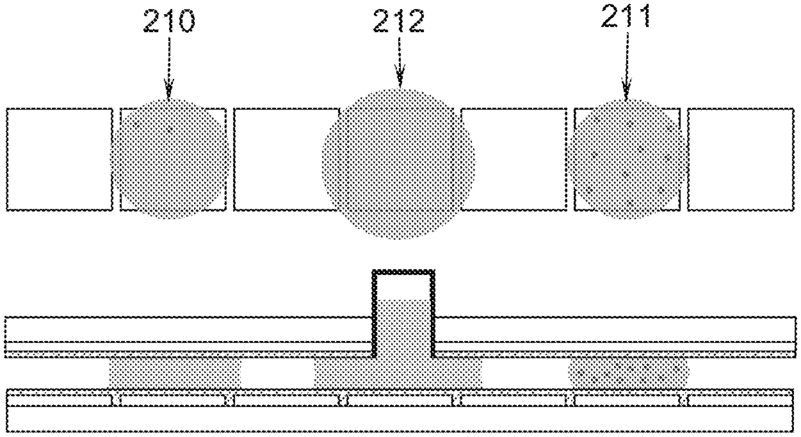
Fig. 2I
Fig. 2J

APPARATUSES AND METHODS FOR OPERATING A DIGITAL MICROFLUIDIC DEVICE

CROSS REFERENCE TO RELATED APPLICATIONS

This application is a continuation of U.S. patent application Ser. No. 16/540,878 filed on Aug. 14, 2019, which claims the benefit of U.S. Provisional Patent Application Ser. No. 62/718,853 filed on Aug. 14, 2018, the entire disclosures each of which are incorporated herein by reference.

FIELD

This disclosure relates to the field of microfluidics. Specifically, it relates to apparatuses and methods for controlling liquids/droplets and manipulating magnetic beads therein on a digital microfluidic device and carrying out processing and/or measurements with the devices.

Described herein are apparatuses and methods for the processing and/or measurements of chemical or biochemical samples on a digital microfluidic device. More specifically, an apparatus comprises all or a subset of the following functional modules 1) a voltage control module to provide control signals to operate the droplets/liquids on the digital microfluidic device; 2) a magnet control module for manipulating magnetic beads in the droplets/liquids on the device; 3) a temperature control module to regulate the temperature of different regions of the device; 4) an optical detection module for contactless measurements of the results of the chemical or biochemical processes conducted on the device; 5) an optical excitation module to provide excitation light source to the droplets/liquids on the device; 6) a capacitance measurement module for position detection and/or volume measurement of the droplets on the device, etc. Also described are methods to configure and operate the modules for efficient processing and measurements of the samples on the device. The apparatus can be used in applications such as DNA/RNA/protein/cell concentration/purification, real-time PCR, isothermal amplification, immunoassay, cell-based assay, library preparation for NGS sequencing, etc.

BACKGROUND

The analyses of biological fluid samples generally involve a series of mechanical, thermal, electrical, magnetic, optical, or enzymatical/chemical processing steps before measurements. Many instruments exist for chemical/biochemical analyses. When using these instruments, a big portion of the sample or reagent required for the chemical/biochemical reaction does not participate in the measurement process, and hence, is wasted. In a digital microfluidic (DMF) device, the dead volume can be significantly reduced, sometimes to zero. This means the amount of sample or reagent needed for an experiment is the amount used for measurement. Not only the cost of using sample/reagent is greatly reduced, the amount of time needed for an analysis can be significantly shortened as well, as the smaller reaction volume can significantly reduce the reagent/sample mixing time.

Compared to the large number of manual handling steps involved in many of the current chemical/biochemical analysis systems, a DMF based system (instrument, device, and methods, etc.) can provide a high degree of integration and automation. This reduces the possibility of human error, and dramatically increases the system reliability and the data quality.

In the field of microfluidics, there are two major categories—channel-based microfluidics and droplet-based digital microfluidics. After decades of research and development, much progress has been made in the field of channel-based microfluidics, and, in the meantime, limitations have been discovered as well. Channel-based microfluidics, as the name suggests, requires liquid to be physically confined in the pre-fabricated channels. The liquid flow is normally unidirectional and not reconfigurable. Particle adhesion to the walls of microfluidic channels is often one of the major causes of deteriorating performance and sometimes failure using the device, which requires special efforts to alleviate this issue. Also, the channel design depends on the many liquid related characteristics such as viscosity and pH value. This sample/application dependent channel design makes it impossible to have a generic universal device format, which makes it difficult to lower the unit cost of channel-based microfluidic devices.

In droplet based digital microfluidics, liquids are operated in a discrete format—droplets, in a two-dimensional space, and droplets can be operated individually. This is the reason that it is called digital microfluidics (DMF). In a DMF device, the liquid/droplet path can be defined at the run-time and can be changed dynamically. Compared to the typically pressure-driven (by external pumps) or electrokinetically-driven (by high voltages) channel-based microfluidics, only low voltages are needed for manipulating the droplets on a DMF device. The driving force is based on electrostatic effects such as electrowetting or dielectrophoresis and is generally independent of the bio-fluids used for analyses and/or diagnostics. This makes it possible to design application independent devices.

In recent years, digital microfluidics technology has gained a lot of interests due to its capability of manipulating individual droplets along with other advantages such as miniaturization, reconfigurability, high degree of integration and automation, etc. Digital microfluidics reduces reagent usage, saves experimentation time and provides ease of sample handling.

So far, millions of organic compounds have been successfully characterized in scientific articles, but there are still millions more waiting to be identified. To be able to determine the very low concentration of chemical compounds in their environment, it is often necessary to perform a series of operations such as: 1) isolation (extraction and separation) of the target analytes/compounds; 2) purification (clean-up) of the target compounds from co-extracted, non-target compounds; 3) sample concentration; 4) measurement; etc.

One of the important tasks in chemical/biochemical analyses is the isolation of a compound of interest from the bulk of the sample. There are many techniques that digital microfluidics can be utilized for such as the separation and extraction of target analytes, such as the use of magnetic beads, liquid-liquid extraction, optical tweezers, hydrodynamic effects, etc.

In modern life sciences and medical diagnostics applications, magnetic beads are often utilized to perform extraction, separation, and purification of analytes. The target analytes bind specifically the surface of the magnetic beads via chemical moieties during extraction. In the process of separation/purification, after immobilizing the magnetic beads using a magnet, unwanted particles and/or fluid can be removed using a pipette or by passing a fluid. Also, utilizing a magnet, the magnetic beads can also be grouped/focused and moved away from their liquid environment for the purposes of removing unwanted particles and/or fluid. Magnetic beads are used as carriers of antigens/antibodies, catalyzers, proteins and nucleic acids, and are found in applications such as DNA separation, mRNA purification, protein purification, cell isolation, rare cell detection, immunoassays, capture of biomolecules, etc.

An immunoassay is a biochemical test to detect the presence or to measure the concentration of an analyte in a solution through the use of an antibody (sometimes an antigen). It is one of the most sensitive and specific methods routinely used in clinical labs. It makes use of the high affinity and specificity in binding between an antigen and its homologous antibody to identify or quantify the antigen in a sample. It is widely used in clinical diagnostics, therapeutic drug monitoring, drug discovery and pharmaceutical industries, etc. A heterogeneous immunoassay is often a preferred method due to its higher sensitivity comparing to a homogeneous immunoassay. In a heterogeneous immunoassay, reagents are added and washed away or separated at different steps of the assay. The separation, of the bound antibody-antigen complex, is often achieved utilizing a solid phase reagent such as a magnetic bead.

Another example of the use of magnetic beads is the library preparation for High Throughput Sequencing, also referred to as Next-Generation Sequencing (NGS).

DNA sequencing is the process of identifying the exact order of nucleotides within a DNA molecule. It includes any approach used to determine the order of the four bases, i.e., Adenine (A), Cytosine (C), Guanine (G), and Thymine (T), in a DNA strand. The four types of bases (A, C, G, and T) are the part of DNA that stores information and gives DNA the ability to encode phenotype, a person's observable characteristics or traits. It is a critical biological technique in modern life sciences. The advent of rapid DNA sequencing methods has greatly accelerated biological and medical research and discovery.

NGS can be used to determine thousands to millions of sequences in a single sequencing process. It has revolutionized genomic research. With the commercialization of various affordable desktop sequencers from companies such as Illumina, Inc., and Thermo Fisher Scientific, NGS is becoming a popular tool for traditional wet-lab biologists.

A genomic library is a collection of the total genomic DNA from a single organism such as human. The quality of the library is critical to the success of NGS. Library preparation (or library construction) in a fast and cost-effective way is becoming more and more important for NGS.

In a typical library preparation protocol, the nucleic acid sample to be sequenced is first randomly fragmented, enzymatically or mechanically. The nucleic acid fragments are further processed to have "adapter" sequences attached to one of both ends of the fragments. This step may require that the fragments are first end-repaired or blunt ended, which is optionally followed by an A-tailing step prior to ligation of the adapter sequences to the sample fragments. The prepared nucleic acid libraries are quantitated and made ready for subsequent sequencing processes. Short sequences of multiplex identifiers or barcodes may also be ligated to the fragments or included within the ligated adapter sequences to assist in sequence assembly.

Magnetic beads are used for clean-up and size selection of DNA fragments in a library preparation. A typical library preparation process is as follows. First, paramagnetic beads selectively bind DNA fragments based on the volume ratio of bead suspension and sample. After magnetic separation and removal of supernatant, the beads are washed with ethanol. Finally, highly purified DNA fragments are eluted with water (or low salt elution buffer) and can be used for downstream applications such as sequencing.

Described herein is an approach to perform magnetic bead separations on a DMF device. By automating the control of magnet(s), magnetic beads can be grouped/focused, transported from one droplet/reservoir to another droplet/reservoir, moved around or released within a droplet/reservoir, or transported to a waste storage position, etc., on a DMF device. In doing so, separation, purification, or concentration of the targeted particles can be achieved.

In the development of microfluidics related products, space constraints have to be taken into account all the time. For example, magnet control modules for magnetic bead operation, temperature control modules for reactions, and optical excitation/detection modules for measurement, etc., all need to be in close proximity with the DMF device. Since they may not be needed at the same time in an experiment, moving certain modules away from the DMF device during certain time can give more working space and motion freedom to other modules. For example, the temperature control modules and/or the optical excitation/detection module can be moved away from the DMF device far enough that the magnet(s) can manipulate the magnetic beads anywhere on the DMF device.

Also provided is a design to use special designed magnets to focus the magnetic field to the point(s) of interest on a DMF device. It also provides a design to shield magnetic field from interfering the magnetic beads in a neighboring sample path (channel). This can increase the number of samples that can be run simultaneously and independently, and hence increases the throughput.

BRIEF DESCRIPTION

Described herein are apparatuses (including a DMF device) and methods for processing and/or measurements of chemical or biochemical samples. Specifically, embodiments are directed to magnetic bead operations on a DMF device. The apparatuses and methods herein may include providing a droplet and/or reservoir including one or more magnetic beads. A magnet may be moved close to the droplet or reservoir to provide a magnetic field strong enough to immobilize the magnetic beads or to move the beads along with the magnet movement. In some cases, the droplet or reservoir may include a target analyte. In some cases, the droplet or reservoir may include unbound substances. In certain embodiments, the droplet operations may be selected to agitate the droplet/liquid to assist the suspending/dispersing of the magnetic beads. The droplet or reservoir may be surrounded by air or by a liquid filler fluid.

In one embodiment, a library preparation for NGS is presented. It illustrates a set of operations carried on the apparatus, including droplet operations, magnetic beads manipulations, and temperature regulations, etc.

Further, provided are methods to move magnetic beads from inside one droplet/reservoir into another droplet/reservoir on a DMF device. This increases the flexibility and functionality of a DMF device in terms of sample processing.

Further, provided are methods to perform beads washing or clean-up in one or more droplets/reservoirs. It may move the beads along a defined trajectory within a droplet or a reservoir, and hence, better washing effect can be achieved compared to keep the beads steady in a droplet/reservoir.

Further, provided are methods for the separation of magnetic beads and a droplet/liquid by grouping/focusing the beads and move them away from the original droplet/liquid.

Further, provided are methods to retrieve a supernatant substantially lacking the magnetic beads by immobilizing the beads to the bottom surface of the DMF device gap while retrieving the supernatant from the top.

Also, provided apparatuses and methods for effecting an assay running on a DMF device. When a DMF device is working with different external modules for the purposes of 1) regulating temperatures of different regions of the device, 2) manipulating magnetic beads on the device, and 3) performing optical measurements, etc., the positions modules can be moved around inside the apparatus to work with the space limitation imposed by the limited size of the device.

In one embodiment, an apparatus is presented with a DMF device docking tray for loading/unloading a DMF device, pogo pin arrays for electrical connection, a temperature control module, a magnet control module, etc.

DETAILED DESCRIPTION

For the purposes of the present disclosure, it will be understood that the word "comprise" and variations thereof such as "comprises" and "comprising" are to be construed in an open and inclusive sense, that is "including, but not limited to".

Reference throughout this specification to "one embodiment", "an embodiment", "one aspect", or "an aspect" means that a particular feature, structure or characteristic described in connection with the embodiment or aspect may be included one embodiment but not necessarily all embodiments. Furthermore, the features, structures, or characteristics disclosed here may be combined in any suitable manner in one or more embodiments.

For purposes of the present disclosure, the term "microfluidic" refers to a device or a system having the capability of manipulating liquid with at least one cross-sectional dimension in the range of from a few micrometers to about a few hundred micrometers.

For purposes of the present disclosure, a DMF device consists a first substrate with a first substrate surface, and a second substrate with a second substrate surface spaced from the first substrate by a distance to define a gap/space between the first and the second substrate surfaces, wherein the distance is sufficient to contain a droplet disposed in said space. An array of first liquid control electrodes are deposited on first substrate surface, and at least some of the electrodes are covered by one layer of dielectric, and at least a portion of the dielectric layer is hydrophobic. At least, for the purpose of grounding, one electrode is deposited on the second substrate surface, at least one portion the electrode is covered by one layer of dielectric, and at least a portion of the dielectric layer is hydrophobic. It further includes the devices presented in patents: Wu, International Patent Pub. No. WO 2008/147568, entitled "Electrowetting Based Digital Microfluidics", published on Dec. 4, 2008; Wu, International Patent Pub. No. WO/2009/003184, entitled "Digital Microfluidics Based Apparatus for Heat-exchanging Chemical Processes", published on Dec. 31, 2008; Wu, International Patent Pub. No. WO 2014/036914, entitled "Electrophoresis Based Apparatuses and Methods for the Manipulation of Particles in Liquids", published on Mar. 13, 2014; Wu, International Patent Pub. No. WO 2014/036915, entitled "Dielectrophoresis Based Apparatuses and Methods for the Manipulation of Particles in Liquids", published on Mar. 13, 2014; Wu, International Patent Pub. No. WO 2018/005843, entitled "High Resolution Temperature Profile Creation in a Digital Microfluidic Device", published on Jan. 4, 2018; Wu, International Patent Pub. No. WO 2018/093779, entitled "Digital Microfluidic Devices", published on May 24, 2018; Pamula et al., U.S. Pat. No. 6,911,132, entitled "Apparatus for Manipulating Droplets by Electrowetting-Based Techniques," issued on Jun. 28, 2005; Pamula et al., International Patent Pub. No. WO 2006/081558, entitled "Apparatuses and Methods for Manipulating Droplets on a Printed Circuit Board," filed on Aug. 3, 2006; Pollack et al., International Patent Pub. No. WO 2007/120241, entitled "Droplet-Based Biochemistry," published on Oct. 10, 2007; Shenderov, U.S. Pat. No. 6,773,566, entitled "Electrostatic Actuators for Microfluidics and Methods for Using Same," issued on Aug. 10, 2004 and U.S. Pat. No. 6,565,727, entitled "Actuators for Microfluidics Without Moving Parts," issued on Jan. 24, 2000; Kim and/or Shah et al., U.S. patent application Ser. No. 10/343,261, entitled "Electrowetting-driven Micropumping," filed on Jan. 27, 2003, Ser. No. 11/275,668, entitled "Method and Apparatus for Promoting the Complete Transfer of Liquid Drops from a Nozzle," filed on Jan. 23, 2006, Ser. No. 11/460,188, entitled "Small Object Moving on Printed Circuit Board," filed on Jan. 23, 2006, Ser. No. 12/465,935, entitled "Method for Using Magnetic Particles in Droplet Microfluidics," filed on May 14, 2009, and Ser. No. 12/513,157, entitled "Method and Apparatus for Real-time Feedback Control of Electrical Manipulation of Droplets on Chip," filed on Apr. 30, 2009; Velev, U.S. Pat. No. 7,547,380, entitled "Droplet Transportation Devices and Methods Having a Fluid Surface," issued on Jun. 16, 2009; Sterling et al., U.S. Pat. No. 7,163,612, entitled "Method, Apparatus and Article for Microfluidic Control via Electrowetting, for Chemical, Biochemical and Biological Assays and the Like," issued on Jan. 16, 2007; Becker et al., U.S. Pat. No. 7,641,779, entitled "Method and Apparatus for Programmable fluidic Processing," issued on Jan. 5, 2010; Roux et al., U.S. Pat. No. 7,531,072, entitled "Device for Controlling the Displacement of a Drop Between two or Several Solid Substrates," issued on May 12, 2009; Adachi et al., U.S. Pat. No. 8,128,798, entitled "Liquid Transfer Device," issued on Mar. 6, 2012; Fogleman et al., International Patent Pub. No. WO 2012/037308, entitled "Droplet Actuator Systems, Devices and Methods," published on Mar. 22, 2012; Bauer, U.S. Pat. No. 9,248,450, entitled "Droplet Operations Platform," issued on Feb. 2, 2016; Bauer et al., U.S. Pat. No. 9,446,404, entitled "Droplet Actuator Apparatus and System," issued on Sep. 20, 2016; Winger, U.S. Pat. No. 9,513,253, entitled "Droplet Actuators and Techniques for Droplet-based Enzymatic Assays," issued on Dec. 6, 2016; Winger, U.S. Pat. No. 9,707,579, entitled "Droplet Actuator Devices Comprising Removable Cartridges and Methods," issued on Jul. 18, 2017;

For purposes of the present disclosure, the term "droplet" is used to indicate one type (or a few types mixed together) of liquid of limited volume is separated from other parts of liquid of the same type by air (or other gases), other liquids (typically not immiscible ones), or solid surfaces (such as inner surfaces of a DMF device), etc. The volume of a droplet can have a huge range—from a few femtoliters to hundreds of microliters. A droplet can take any arbitrary shape, such as sphere, semi-dome, flattened round, or irregular, etc.

For purposes of the present disclosure, the term "reservoir" is used to indicate an enclosure or partial enclosure on a DMF device configured for storing, holding, or supplying liquid. It may be a reservoir in the droplet operations gap or on the droplet operations surface. A reservoir may be associated with a fluid path that permits a droplet to be brought into a droplet operations gap or into contact with a droplet operations surface.

For purposes of the present disclosure, the term "filler fluid" is used to indicate a fluid that is sufficiently immiscible with a droplet so that electrostatic based droplet operations can be performed on a DMF device. A filler fluid may be a low-viscosity oil such as silicone oil. The viscosity is typically less than 20 cSt (centistokes), or 10 cSt, or 5 cSt, or 2 cSt. The filler fluid may fill the entire gap of the device. It may be loaded only at specific a well/reservoir so that a droplet dispensed from said well/reservoir is coated with thin layer of the filler fluid.

The term "less than" disclosure typically means "equal to or less than," unless specified.

For purposes of the present disclosure, the term "droplet operation" may include droplet dispensing (from a reservoir or a continuous stream of fluid), transporting, merging/mixing, splitting, shaping, particle suspending/distribution (within a droplet), etc.

For purposes of the present disclosure, the term "analyte" is a substance or a chemical constituent that undergoes measurement or analysis and is typically contained in the liquid sample to be assayed. Suitable analytes include organic and inorganic molecules. It may be biomolecules (including proteins, lipids, cytokines, hormones, carbohydrates, etc.), viruses (including herpesviruses, retroviruses, adenoviruses, lentiviruses, etc.), whole cells (including prokaryotic and eukaryotic cells), environmental pollutant (including toxins, pesticides, insecticides, etc.), therapeutic molecules (including antibiotics, therapeutic and abused drugs, etc.), nuclei, spores, etc.

For purposes of the present disclosure, the term "antigen" is a toxin or other foreign substance that is capable of inducing an immune response (to produce an antibody) in the host organism.

For purposes of the present disclosure, the term "antibody" is a large Y-shaped protein molecule produced mainly by plasma cells that is used by immune system to neutralize pathogen such as pathogenic bacteria or viruses. An antibody binds specifically with its corresponding antigen. An antibody can be labeled/conjugated to another molecule (for example, a fluorescent tag or an enzyme) to facilitate the detection and/or quantification of the antibody.

For purposes of the present disclosure, the term "reagent" describes any material useful for reacting with, diluting, solvating, suspending, emulsifying, encapsulating, interacting with, or adding to a sample material.

For purposes of the present disclosure, the term "focusing magnet" is used to refer to a magnet (permanent magnet or electromagnet) with specified shape that that the magnetic field on one side is stronger than that on the opposite side. Examples include, but are not limited to, cone magnets or pyramid magnets. The magnetic field at the tip of a cone magnet (or a pyramid magnetic) is stronger than the magnetic field at the base.

For purposes of the present disclosure, the term "beads" is used to indicate any bead or particle on a DMF device that is capable of interacting with a droplet therein. Beads may be any of a wide variety of shapes, such as spherical, substantially spherical, cubical, egg shaped, disc shaped, or other three-dimensional shapes. Beads may be provided in a droplet, in a droplet operations gap, or on a droplet operations surface. Beads may also be provided in a reservoir that is external to a droplet operations gap or situated apart from a droplet operations surface, and Beads may be brought into contact with a droplet, be transported in a droplet, or brought on and/or off a DMF device. Beads may be manufactured using a wide variety of materials, including but not limited to, resins, polymers, metals oxides, etc. Beads may be any suitable size, such as microbeads, nanobeads. Beads may be magnetically responsive in some cases, and significantly not magnetically responsive in other cases. Examples of beads include, but not limited to, polystyrene microfluidics, flow cytometry microbeads, silica microbeads, fluorescent microspheres, magnetic microbeads, etc.

For purposes of the present disclosure, the term "magnetic beads" contain magnetically responsive materials. Examples of magnetically responsive materials include ferromagnetic materials, paramagnetic materials, metamagnetic materials, and ferrimagnetic materials, etc. Examples of paramagnetic materials include metals like nickel, iron, and cobalt, and metal oxides such as $Fe_3O_4$, $Cr_2O_3$, NiO, $Mn_2O_3$, etc. The magnetically responsive material may constitute substantially all of a bead, a portion of a bead, or only one component of a bead. The remainder of the bead may include, but is not limited to, polymeric material, coatings, and moieties which permit attachment of a targeted particle. Magnetic beads are used in various assays, in which the beads are typically used to bind to one or more target substances in a mixture of substances. The target substances may be, for example, analytes or contaminants. There is typically a need for efficient bead washing in order to reduce the amount of one or more substances in a bead-containing droplet that may be in contact with or exposed to the surface of the bead(s).

Magnetic beads coated with antihuman serum albumin antibodies have been used to isolate human serum albumin, as proof of concept work for immunoprecipitation using digital microfluidics. DNA extraction from a whole blood sample has also been performed with digital microfluidics. The procedure follows the general methodology as the magnetic particles but includes pre-treatment on the digital microfluidic platform to lyse the cells prior to DNA extraction.

For purposes of the present disclosure, the term "immobilize" is used to indicate that the magnetic beads are substantially restrained in position, in a droplet, in a liquid reservoir, or in filler fluid, on a DMF device. For example, in one embodiment, immobilized magnetic beads are substantially restrained in position in a droplet to permit execution of a droplet splitting operation, yielding one droplet with most of the beads and the other droplet substantially lacking the beads.

For purposes of the present disclosure, the term "washing" with respect to washing magnetic beads is used to indicate reducing the amount/number or the concentration of magnetic beads in one or more substances in contact with the beads or exposed to the beads from a droplet in contact with the beads. The reduction in the in the amount or concentration of the substance can be partial, significantly complete, or complete. The substance may be any of a wide variety of substances, such as components of a sample, contaminants, or excess reagent. The washing operation may proceed using a set of droplet operations.

For purposes of the present disclosure, the term "particles" is used to indicate micrometric or nanometric entities, either natural ones or artificial ones, such as cells, subcellular components, viruses, liposomes, nanospheres, and microspheres, or even smaller entities, such as macromolecules, proteins, DNAs, RNAs, etc., as well as droplets of liquid immiscible with the suspension medium, or bubbles of gas in liquid. The sizes of the "particles" range from a few nanometers to hundreds of micrometers.

For purposes of the present disclosure, the term "library", or its derived term "DNA library," is used to refer a collection of similarly sized DNA fragments with known adaptor sequences added to the 3 prime and 5 prime ends. A library corresponds to a single sample. Typically, multiple libraries, each with their unique adaptor sequences, can be pooled together to sequence in the same sequence run.

For purposes of the present disclosure, "bead/beads manipulation/operation" may consist of one of the following operations and/or combinations thereof:

1. Group (or focus)—to group the magnetic beads within a certain range—within a droplet, within a reservoir, or in an area between droplets/reservoirs, etc., on a DMF device. The size of a grouped/focused magnetic beads is smaller than 10 mm, or smaller than 5 mm, or smaller than 2 mm. It should be pointed that the grouped/focused magnetic beads (in a droplet/liquid) in general have a clear boundary as a solid object but can be rather blurry. The size of a grouped/focused magnetic beads has more than 60% of the beads in the droplet/liquid, or more than 70%, or more than 80%, or more than 90%, or more than 95%.
2. Immobilize—to keep a magnetic bead in a position on a DMF device for a specified period of time, during which droplet operations can be performed.
3. Transport—to move a magnetic bead from one location to another on a DMF device. It includes, but is not limited to, to move the magnetic bead from one droplet/reservoir to another droplet/reservoir.
4. Suspend/disperse—to release magnetic beads within a droplet or reservoir by removing the magnetic field. This can be accompanied by droplet operations.

Apparatuses and methods are provided to process and/or measure target analytes in a sample solution. As will be appreciated by those in the art, the sample solution may include, but is not limited to, bodily fluids (including, but not limited to, blood, serum, saliva, urine, etc.), purified samples (such as purified DNA, RNA, proteins, cells, etc.), environmental samples (including, but not limited to, water, air, agricultural samples, etc.), and biological warfare agent samples, etc. While the bodily fluids can be from any biological entities, in some embodiments, the sample solution can be bodily fluids from mammals, such as that from a human.

For purposes of the present disclosure, the term "biomarker" refers to something that can be used as an indicator of a particular disease state or some other physiological state of an organism, or the body's response to therapy. A biomarker can be, a protein measured in (but not limited to) blood (whose concentration reflects the presence or severity of a disease), a DNA sequence, a traceable substance that is introduced into an organism as a means to examine organ function or other aspects of health, etc.

For purposes of the present disclosure, the term "amplification" refers to a process that can increase the quantity or concentration of a target analyte. The grandfather technique is Polymerase Chain Reaction (PCR), which is described in detail in U.S. Pat. Nos. 4,683,195, 4,683,202, and 4,800,159. Briefly, in PCR, two primer sequences complementary to regions of a target sequence are prepared. Sufficient amount of deoxynucleotide triphosphates and a heat-stable DNA polymerase (e.g., Taq polymerase) are added to a reaction mixture. If a target sequence is present in a sample, the primers will bind to the target and the polymerase will cause the primer to be extended by adding nucleotides. By raising and lowering the temperature of the reaction mixture, the target sequence is exponentially amplified. PCR has many variations such as quantitative competitive PCR, immune-PCR, reverse transcriptase PCR, etc.

Other amplification protocols include Strand Displacement Amplification (SDA), Ligase Chain Reaction (LCR), Nucleic Acid Sequence Based amplification (NASBA), Loop-mediated isothermal amplification (LAMP), helicase-dependent amplification (HAD), etc. These various non-PCR amplification protocols have various advantages, but PCR remains the main method in the molecular biology lab and in clinical diagnostics. Embodiments disclosed here for microfluidic PCR should be considered representative and exemplary of a general class of DMF devices capable of executing one or various amplification protocols.

For purposes of the present disclosure, the terms "layer" and "film" are used interchangeably to denote a structure of body that is typically but not necessarily planar or substantially planar, and is typically deposited on, formed on, coated, treated, or is otherwise disposed on another structure.

For purposes of the present disclosure, the term "electronic selector" describes any electronic device capable to set or change the output signal to different voltage or current levels with or without intervening electronic devices. As a non-limiting example, a microprocessor along with some driver chips can be used to set different electrodes at different voltage potentials at different times.

As used herein, the term "ground" (example, "grounding", "ground electrode" or "ground voltage") indicates the voltage of corresponding electrode(s) is set to zero or substantially close to zero. All other voltage values should be, although typically less than 300 volts in amplitude, high enough so that substantially electrophoretic, dielectrophoretic, and electrowetting effect can be observed.

In some embodiments, the spaces between adjacent electrodes at the same layer are generally filled with the dielectric material when the covering dielectric layer is disposed. These spaces can also be left empty or filled with gas such as air, nitrogen, helium, and argon. All the electrodes at the same layer, as well as electrodes at different layers, are preferably electrically isolated.

As used herein, the term "contact angle" indicates the angle measured through the liquid, where a liquid-vapor interface meets a solid surface. At a thermodynamic equilibrium between the three phases—the liquid phase (L), the solid phase (S), and the gas (or vapor) phase (G), which could be a mixture of ambient atmosphere and an equilibrium concentration of the liquid vapor, the shape of the liquid-vapor interface is determined by the Young-Laplace equation.

$$\gamma_{SG}-\gamma_{SL}-\gamma_{LG}\cos\theta_c=0$$

where $\gamma_{SG}$ denotes the solid-vapor interfacial energy, $\gamma_{sL}$ denotes the solid-liquid interfacial energy, $\gamma_{LG}$ denotes the liquid-vapor interfacial energy (i.e., the surface tension), and $\theta_c$ denotes the equilibrium contact angle. A schematic of a liquid droplet showing the quantities in the Young-Laplace equation is shown in FIG. 9. It should be pointed out that the equation also works if the gas phase is replaced by another immiscible liquid phase.

In a pure liquid, each molecule in the bulk is pulled equally in every direction by neighboring liquid molecules, resulting in a net force of zero. However, the molecules exposed at the surface do not have neighboring molecules in all directions to provide a balanced net force. Instead, they are pulled inward by the neighboring molecules, creating an internal pressure. As a result, the liquid contracts its surface area to maintain the lowest surface free energy. This intermolecular force, i.e., liquid-vapor interfacial energy $\gamma_{LG}$, to contract the surface is called the surface tension, and it is responsible for the shape of liquid droplets. In practice, external forces such as gravity deform the droplet; consequently, the contact angle is determined by the combination of surface tension and external forces (typically gravity). The contact angle is expected to be characteristic for a given solid-liquid system in a specific environment.

A hydrophobic surface has the property of repelling a liquid, and a hydrophilic surface has the property of attracting a liquid. For purposes of the present disclosure, for a specific, a "hydrophobic surface" has a contact angle greater than 90°, and a hydrophilic surface has a contact angle less than 90°.

For purposes of the present disclosure, the term "communicate" (e.g., a first component "communicates with" or "is in communication with" a second component) is used herein to indicate a structural, functional, mechanical, electrical, optical, or fluidic relationship, or any combination thereof, between two or more components or elements. As such, the fact that one component is said to communicate with a second component is not intended to exclude the possibility that additional components may be present between, and/or operatively associated or engaged with, the first and the second components.

For purposes of the present disclosure, it will be understood that when a liquid in any form (e.g., a droplet or a continuous body, whether moving or stationary) is described as being "on," "at," or "over" an electrode, array, matrix or surface, such liquid could be either in direct contact with electrode/array/matrix/surface, or could be in contact with one or more layers or films that are interposed between the liquid and the electrode/array/matrix/surface.

For purposes of the present disclosure, it will be understood that when a given component such as a layer, region or substrate is referred to herein as being disposed or formed "on," "in," or "at" another component, that given component can be directly on the other component or, alternatively, intervening components (e.g., one or more buffer layers, interlayers, electrodes or contacts) can also be present. It will be further understood that the terms "disposed on" and "formed on" are used interchangeably to describe how a given component is positioned or situated in relation to another component. Hence, the terms "disposed on" and "formed on" are not intended to introduce any limitations relating particular methods of material transport, deposition, or fabrication.

For purposes of the present disclosure, the terms "detection" and "measurement" are used interchangeably to denote a process of determining a physical quantity (such as position, charge, temperature, concentration, pH, luminance, and fluorescence, etc.). Normally at least one detector (or sensor) is used to measure a physical quantity and convert it into a signal or information which can be read by an instrument or a human. One or more components may be used between the object being measured and the sensor, such as lenses, mirrors, and filters in optical measurements, or resistors, capacitors, and transistors in electronic measurements, etc. Also, other apparatuses or components may be used to make it easier or possible to measure a physical quantity. For example, when using the fluorescence intensity is used to deduce the particle concentration of, a light source, such as a Laser or Laser diode, may be used to excite the particles to the electronic excited states from their electronic ground state, which emits fluorescence light when returning to their ground states. The sensors can be a CCD (Charge Coupled Device), a photodiode, and a photomultiplier tube, etc., in optical measurements, or operational amplifier, analog-to-digital convertor, thermocouple, and thermistor, etc., in electronic measurements.

Detection or measurement can be done to a plurality of signals from a plurality of products, either simultaneously or sequentially. For example, a photodiode can be used to measure of the fluorescence intensity from a particular type of particles in a droplet, while the position of the said droplet is sensing by a capacitance measurement at the same time. Also, a detector (or sensor) can include or be operably linked to a computer, e.g., which has software for converting detector signal to information that a human or other machine can understand. For example, the fluorescence intensity information is used to deduce the concentration of can be converted to particle concentration.

For purposes of the present disclosure, the term "elongated" is used to indicate an object, such as an electrode or temperature control element, has a functional surface that the length that is at least 3 times or more than the width; preferably, 5 times or more; and even more preferably, 10 times or more.

BRIEF DESCRIPTION OF THE DRAWINGS

FIGS. 1A, 1C, 1E, 1G, 1I, and 1K are top views of DMF devices described herein. FIGS. 1B, 1D, 1F, 1H, 1J, and 1L are side views of DMF devices described herein.

FIGS. 2A-2J illustrate top and side views of a portion of a DMF device with droplets, a liquid reservoir, and magnetic beads, and a process of operating the magnetic beads using a magnet. FIGS. 2A, 2C, 2E, 2G, and 2I are top views of DMF devices described herein. FIGS. 2B, 2D, 2F, 2H, and 2J are side views of DMF devices described herein.

FIG. 7A is the top-front-side view of the apparatus. FIG. 7B is the top view, and FIG. 7C is the rear view of the apparatus.

Detailed features and advantages, as well as the structure and operation of various embodiments, are described below with reference to the accompanying drawings. It should be pointed out that the invention is not limited to specific embodiments described herein. Such embodiments are presented herein for illustrative purposes only. Additional embodiments will be apparent to persons skilled in the relevant art based on the teachings contained herein.

DETAILED DESCRIPTION OF THE DRAWINGS

In the description that follows, the present invention will be described in reference to embodiments that process chemical and biochemical samples. More specifically, the embodiments will be described in reference to apparatuses for use with a DMF device. The description of the embodiments that follows is for purposes of illustration and not limitation.

The accompanying drawings, which are incorporated herein and form a part of the specifications, illustrate and, together with the description, further serve to explain the principles of this disclosure and to enable a skilled person in the pertinent art to make and use the apparatuses and methods described.

For the purposes of this disclosure, an automated control is provided for some or all of the functional modules—the magnet control module, the temperature control module, the optical module, etc. A program (software or firmware) running on a microprocessor or a computer system is typically implemented for automated control(s).

Figures 1A, 1B, 1C, 1D, 1E, 1F:
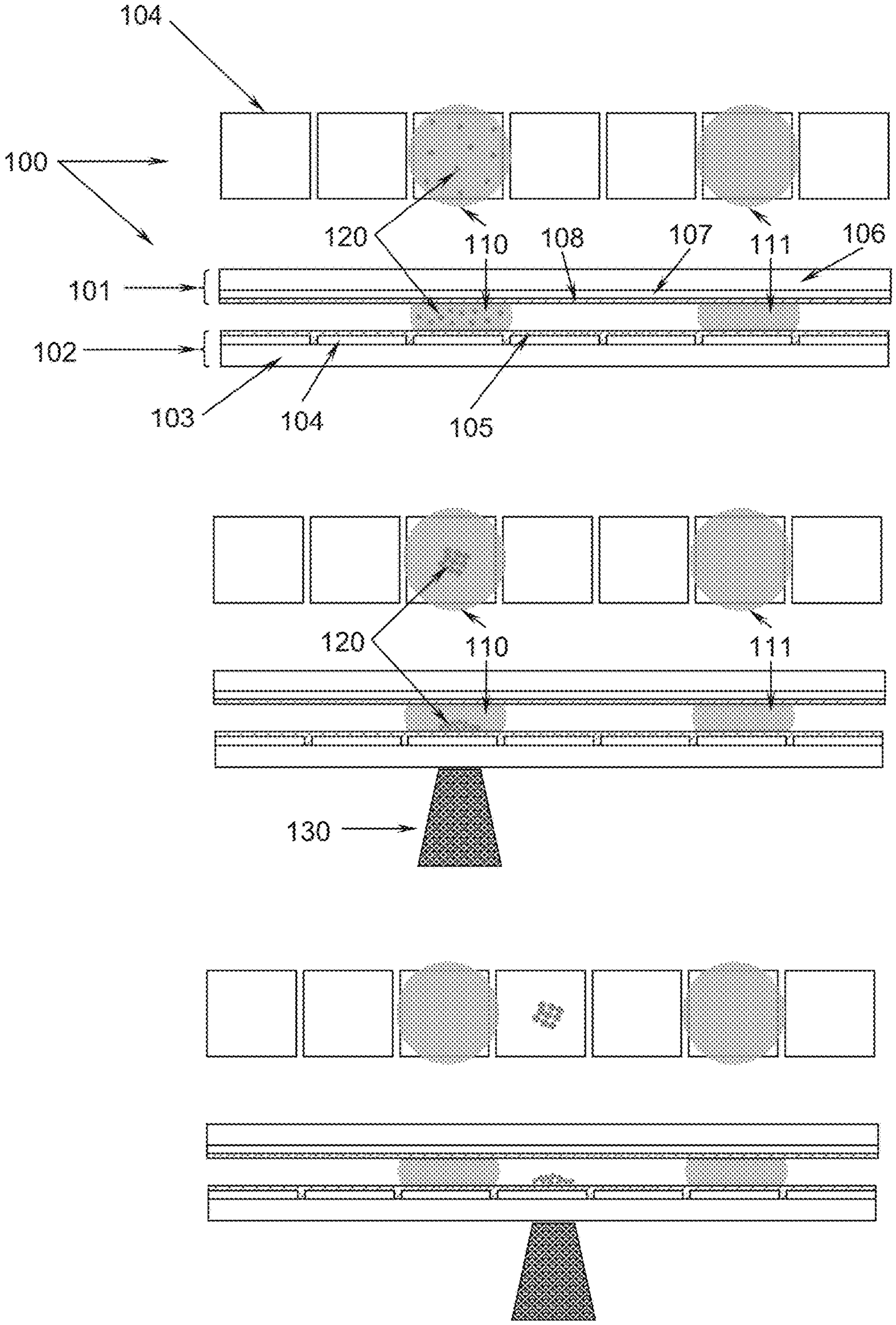
FIGS. 1A-1L illustrate top and side views of a portion of a DMF device with droplets and magnetic beads, and a process of operating the magnetic beads using a magnet.
Figure 1G:
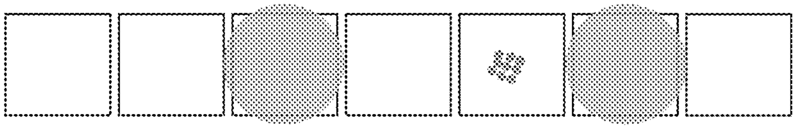
Figure 1H:
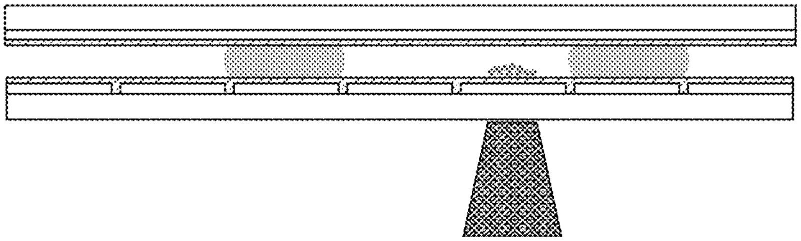

Referring to FIGS. 1A-1L, a portion of a DMF device, generally designated 100, is illustrated as a preferred embodiment for effecting magnetic bead manipulations. FIG. 1A is the top view showing only the electrodes 104 of the device. Two droplets 110 and 111 are also shown, with droplet 110 containing magnetic beads 120. FIG. 1B is the side view of device. FIG. 1B shows the droplets 110 and 111 are sandwiched between an upper plate 101 and a lower plate 102 of the device. The lower plate contains the droplet control electrodes 104, along with its substrate 103 and the dielectric layer 105. The upper plate contains a ground electrode 107, along with its substrate 106 and the dielectric layer 108. It should be pointed out that the DMF device structure shown here is for the purpose of illustrating magnetic bead manipulations. It is by no means to be inclusive. In some embodiments, the DMF device can have be implemented in a variety of different ways. For example, 1) the control electrodes can have different shapes, such as square, rectangular, trapezoidal, or irregular shapes, and can be arranged other than a straight line; 2) the control electrodes can be at different layers (typically electrically isolated), as described in patent WO 2008/147568, entitled "Electrowetting Based Digital Microfluidics"; 3) the dielectric layer can have two or more different layers of different materials (e.g., Parylene C, Silicon Nitride, Silicon Dioxide, Tantalic Oxide, and Cyanoresin from Shin-Etsu Chemical Co., etc.), in which one can be hydrophobic material such as Teflon™, Cytop®, or FluoroPel from Cytonix, etc.

A substrate can be any non-conducting material or conducting material coated with non-conducting layers, as long as it has enough mechanical strength to keep its shape within the required system operation and storage conditions. It can be transparent, translucent, or opaque, in terms of light transmission capacity. A transparent substrate could be fabricated from variety of transparent materials such as glass, quartz, plastic, or transparent ceramics, etc. An electrode can be made of any conducting material such as a metal/alloy, or a conducting polymer. It can be made of one material or a mixture of different materials. A transparent electrode on a DMF device can be made of transparent conducting materials such as indium tin oxide (ITO), aluminum-doped zinc-oxide (AZO), transparent conducting polymers (polyacetylene, polyaniline, etc.), or transparent nano-materials, etc.

A voltage control module is used to provide control signals to the droplet control electrodes. It typically has multiple outputs, up to 1000000, or up to 100000, or up to 10000, or up to 1000. The voltage output can be unipolar or bipolar, with amplitude less than 1000 Volts, or less than 300 Volts, or less than 100 Volts, or less than 60 Volts, or less than 30 Volts. The voltage output can be DC (direct current) or AC (alternating current) electrical signal with frequency less than 10 MHz (Megahertz), or less than 1 MHz, or less than 100 KHz (Kilohertz), or less than 20 KHz. The waveforms of the outputs can be square wave, sinusoidal, sawtooth, pulse width modulated signal, etc. A voltage control module is typically controlled by an on-board microprocessor or a computer though connections such as SPI (Serial Peripheral Interface), I2C (Inter-Integrated Circuit), USB (Universal Serial Bus), parallel port, Ethernet, Wi-Fi, or Bluetooth, etc., so that the sequences, durations, amplitudes, or frequencies of the outputs can be programmed. For example, AD5535 from Analog Devices is a 32-channel 14-bit DAC (Digital-to-Analog Converter) with an on-chip high voltage output amplifier. It can output 32 voltage signals (each one up to 200 Volts). Using a microcontroller, different unipolar waveforms can be generated. Another approach is 1) to use a DAC from a microcontroller (or a separate DAC chip controlled by a microcontroller) to generate a low voltage waveform; 2) to use a high voltage power operational amplifier (such as MP400, PA83, PA99, PA194, PA443, etc., from Apex Microtechnology) to amplify to high enough voltage; and 3) to use high voltage relays (such as G3VM-101HR1 from Omron Electronics, AEP31024 from Panasonic, FTR-J2AK110 W from Fujitsu, etc.) or switches (such as MAX4968B or MAX14866 from Maxim Integrated, HV583 or HV2801 from Microchip Technology, etc.) to route the output to different droplet control electrodes. Spring loaded electrical contacts pins or connector pads can be used to deliver multiple high voltage control signals to the DMF device.

Figure 1I:
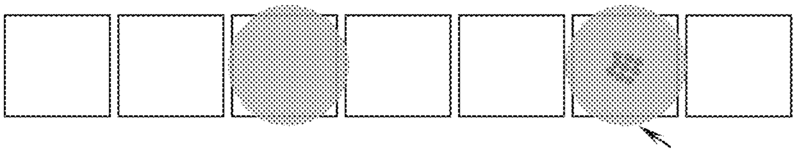
Figure 1J:
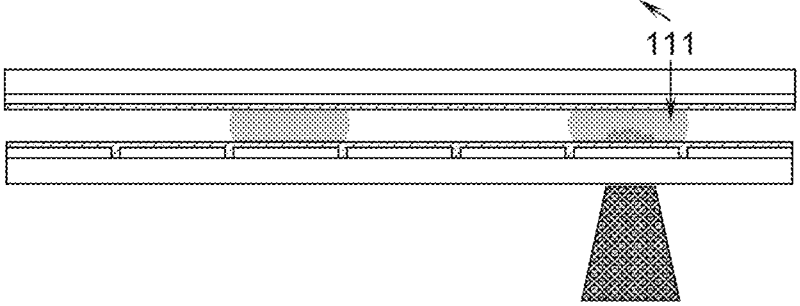
Figure 1K:
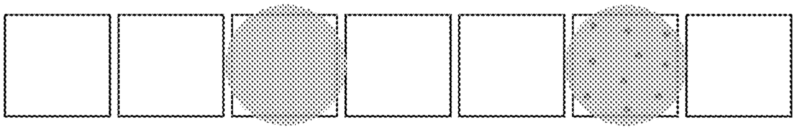
Figure 1L:
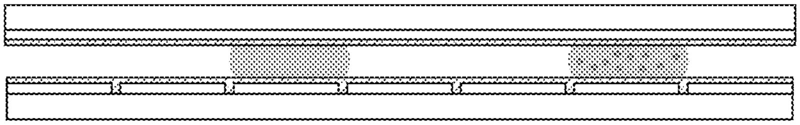

Similar to FIG. 1A, FIGS. 1C, 1E, 1G, 1I and 1K are the top views of the devices, and FIGS. 1D, 1F, 1H, 1J and 1L are their corresponding side views, like FIG. 1B. In FIGS. 1A and 1B, magnetic beads are evenly distributed in droplet 110. In FIGS. 1C and 1D, a magnet 130 is brought to close proximity to the device, and the magnetic beads move close to each under the magnetic field exerted from the magnet 130. The magnet moves the magnetic beads to the right as it moves, as shown in FIGS. 1E to 1J. As can be seen in FIGS. 1I and 1J, the magnetic beads are now in droplet 111. In FIGS. 1K and 1L, the magnet is removed, and the magnetic beads are resuspended/dispersed in the droplet. Droplet movement and/or agitation, or other means, may be needed to help the magnetic beads suspend/disperse in the droplet.

The droplets may be surrounded by air or a filler liquid such as silicone oil. FIGS. 1A-1L illustrate magnetic beads being moved/transported from inside one droplet, through the media (air or a filler liquid), into another droplet. As shown in the Figures, the device is hydrophobic for the droplets. When the electrodes 104 are activated (by applying voltages), the droplets can be operated (move, split, merge, etc.) by electrowetting effect.

The phrases like "magnet being brought/moved/transported to close proximity to", "magnet being moved close to", and the like, as used herein to refer to the relative positions of a magnet and a DMF device, are intended to refer that the magnetic field/force generated by the magnet has significant effect on a magnetic bead on the device. Conversely, phrases like "magnet being moved away from," "magnet being moved out," and the like, are intended to refer that the magnet has insignificant to zero effect on a magnetic bead on the device.

Depending on different assays, the magnet, typically controlled by a motor, can be moved at different speeds, for example 0.1-1000 mm/sec, 0.5-500 mm/sec, or 1-100 mm/sec.

In the above-mentioned embodiment, the magnet makes a contact to the bottom substrate and moves along the bottom side of the DMF device. In some embodiments, the magnet can be situated on top of the device, or a pair of magnets, one on top and the other on the bottom, are used for the manipulations of the magnetic beads on the device.

Referring to FIGS. 2A-2J, a portion of a DMF device, generally designated 200, is illustrated as a preferred embodiment for effecting magnetic bead manipulations. FIG. 2A is the top view showing only the electrodes 204 of the device. Two droplets 210 and 211 are also shown, with droplet 110 containing magnetic beads 220. Also shown is a liquid in reservoir 209. FIG. 2B is the side view of FIG. 2A. FIG. 2B shows the droplets 210 and 211 are sandwiched between an upper plate 201 and a lower plate 202 of the device. It also shows a reservoir 209 with liquid 212. The lower plate contains the droplet control electrodes 204, along with its substrate 203 and the dielectric layer 205. The upper plate contains a ground electrode 207, along with its substrate 206 and the dielectric layer 208. It should be pointed out that the DMF device structure shown here is for the purpose of illustrating magnetic bead manipulations. It is by no means to be inclusive. In some embodiments, the DMF device can be implemented in a variety of different ways.

Similar to FIG. 2A, FIGS. 2C, 2E, 2G, and 2I are the top views of the devices, and FIGS. 2B, 2D, 2F, 2H, and 2J are their corresponding side views. In FIGS. 2A and 2B, magnetic beads are evenly distributed in droplet 110. In FIGS. 2C and 2D, a magnet 230 is brought to a close proximity to the device, and the magnetic beads move close to each under the magnetic field exerted from the magnet 230. The magnet moves the magnetic beads to the right as it moves, as shown in FIGS. 2E, 2F, 2G and 2H. As can be seen in FIGS. 2G and 2H, the magnetic beads are now in droplet 211. In FIGS. 21 and 2J, the magnet is removed, and the magnetic beads disperse in the droplet. Droplet movement and/or agitation, or other means, may be needed to assist dispersing the magnetic beads in the droplet.

In FIGS. 2A-2J, the droplets can be surrounded by air or a filler liquid such as silicone oil. FIGS. 2A-2J illustrate magnetic beads being moved/transported from inside one droplet, through the media (air or filler liquid) and a liquid reservoir, into another droplet. As shown in the Figures, the device is hydrophilic for droplet 210 and liquid 212 in the reservoir area but is hydrophobic for droplet 211. When the electrodes 204 are activated (by applying voltages), droplet 211 can be operated (move, split, merge, etc.) by electrowetting effect. But for droplet 210 and liquid 212, there is little or no electrowetting effect, and hence, they cannot be operated like droplet 211. This is significant. It means that even a liquid/reagent without electrowetting effect can still be used in an assay on a DMF device.

It should be pointed that the magnet can carry the magnetic beads and move around within a droplet or/reservoir. The trajectory can be a circle, an eclipse, a cross, or irregular one. It can also release the beads and focus them again within the droplet. This can increase the binding or washing efficiency.

Electrowetting is the modification of the wetting properties of surface, from hydrophobic to hydrophilic, with an applied electric field. Electrowetting effect happens to many liquids, such as water, almost all the human body fluids such as the whole blood, serum, plasma, etc. For some other liquids, low surface tension ones in general, there is little or no "electrowetting" effect. These liquids include, but not limited to, ethanol, chloroform, acetone, methanol, acetonitrile, etc. When these liquids are disposed into a DMF device, they cannot be easily operated by the electrowetting effect. The fact that a magnetic bead can be moved in and out these liquids/droplets greatly increases the flexibility and functionality of a DMF device.

In one embodiment, certain areas of the inner surface of the DMF device can be purposely made hydrophilic, so when a droplet is transported there, it cannot be moved away by electrowetting effect. However, magnetic bead manipulations can still be carried out.

In the above-mentioned embodiment, the magnet makes a contact to the bottom substrate and moves along the bottom side of the DMF device. It should be pointed out that, the magnet can be situated on top of the device, or a pair of magnets, one on top and the other on the bottom, are used for the manipulations of the magnetic beads on the device.

Figure 3A:
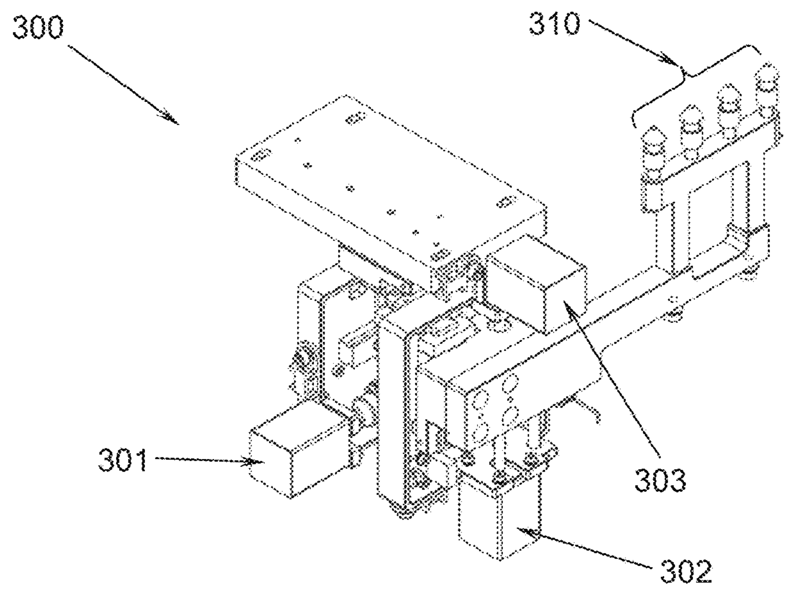
FIG. 3A shows an example of a magnet control module of magnets with of 3 degrees of freedom of movement (or 3 independent motions).

FIG. 3A illustrates an embodiment of a magnet control module with 4 magnets 310. The magnet control module comprises 3 linear motion actuators 301, 302, and 303. Here, actuator 302 can move the magnets 310 up and down relative to a DMF device, so that the magnets can be used the effect a magnet bead on the device. The range of motion is large enough that the magnets can be moved to be close to (or to make contact with) the bottom substrate of the device to deliver the maximum magnetic force, or further away that the magnets have zero or insignificant effect on the magnetic bead. Actuators 301 and 303 can be used to move magnets 310 parallel to the bottom substrate of the device. The directions of motions driven be actuators 301 and 303 are perpendicular to each other. An actuator may comprise a holder for a magnet, a linear motor or a rotary motor, one or more rotating screws, a gearbox, limited switch(es), and/or a home switch, etc. The motor may have an absolute encoder or a relative encoder. An absolute encoder provides the absolute position information of the motion. A relative encoder can be used with a home switch sensor to provide the position information of the motion. The actuator can be operably connected to a power supply and a control device that can be a microprocessor or computer for regulating the position, speed, acceleration/deceleration, and time at a given position of the magnet control module in relation to the DMF device.

In some embodiments, when a motion or direction is said to be perpendicular to a DMF device, it means that the motion or direction is perpendicular to the bottom surface of the DMF device. Also, a DMF device, when in use, is always laid in a docking tray horizontally. So, a direction that is perpendicular to a DMF device is the same as the vertical direction, and a direction that is parallel to a DMF device is the same as a horizontal direction.

In some embodiments, the term "linear motion" means that the movement is along a straight line. A rigid object such as a magnet can have six degrees of freedom of movement.

There are three translational motions—moving up and down, moving left and right, and moving forward and backward, and there are also three rotational motions—swiveling left and right (or yawing), tilting forward and backward (or pitching), and pivoting side to side (or rolling). A linear motion is a translational motion, and it is along a straight line.

It should be pointed out that this embodiment is meant to be inclusive. A magnet control module can have more or less than 3 actuators. It can even have a magnet control module with nonlinear motions, as suited/required by an experiment.

The four magnets (310) in FIG. 3A can only be moved along the same direction and by the same distance. In a different embodiment, the magnets may be individually controlled, which increases the flexibility to run an experiment.

For example, the magnet(s) can be moved into a position so that it exerts sufficient force to capture or immobilize the magnet beads in the DMF device. The actuator can move the magnet(s) away from a function position to a release position so that the magnet(s) generate zero or insignificant magnet field in the DMF device.

Figure 3B:
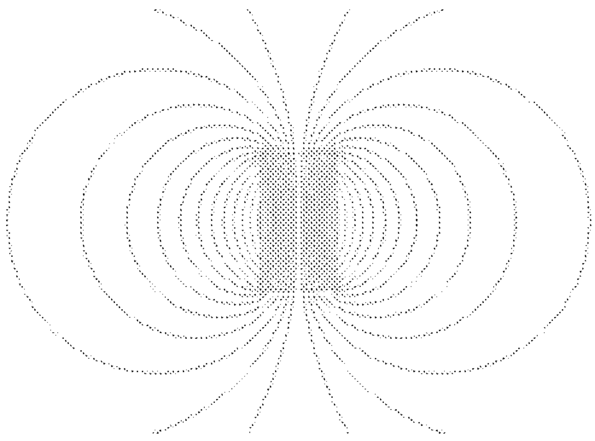
FIGS. 3B and 3C show the magnetic field distributions of two magnets with different shapes.
Figure 3C:
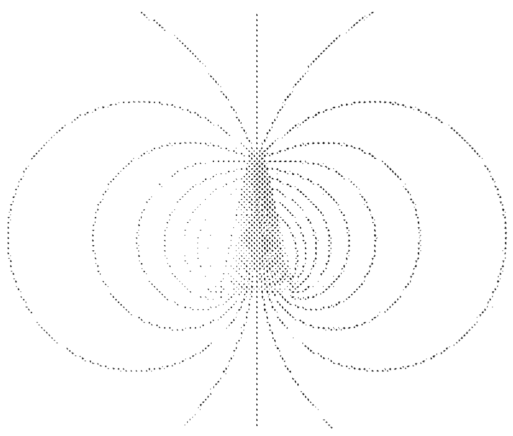

A magnet 310 can be a permanent magnet, an electromagnet, or a combination of the two. It is worthwhile to point out that rare earth magnets (such as neodymium magnets) are often preferred in such applications due to the strong magnetic fields they can provide compared to other types such as ferrite or alnico magnets and the reasonable cost. A magnet 310 can have different shapes as required by the application. In one embodiment, cylinder shaped magnets are used as they are readily available. In another embodiment, cone or pyramid shaped magnets are used as strong magnetic field can be produced at the tip due to the focusing effect of the (cone and pyramid) shapes. FIGS. 3B and 3C show the magnetic field distribution of a cylindrical magnet (diameter of 8.3 mm and height of 15 mm) and a cone magnet (base diameter of 8.3 mm and height of 15 mm), respectively. The same material (neodymium) is used to make the magnets in FIGS. 3B and 3C.

In some embodiments, the magnets of the control module can be moved from a distant position into a function position, or capture position, in close proximity to a region of the DMF device. The distance between the top of the magnet(s) and the bottom of the DMF device within about 0.1, 0.2, 0.3, 0.5, 0.8, 1.0, 1.5, 2, 5, or 10 mm, when the magnet(s) are in close proximity of the device. Or the top of the magnet(s) can make a direct contact with the bottom of the DMF device.

The magnetic field generated by a magnet that is in close proximity with a DMF device can be from 10 to 50000 Gauss, or from 100 to 20000 Gauss, or from 500 to 15000 Gauss in the device gap and right above the magnet. The strength of the magnet should be chosen that it is strong enough to operate the beads in DMF device efficiently, but not too strong in order to avoid irreversible aggregation of the magnetic beads.

The magnet control module can be used, for example, in the movement, capture, confinement, and release of reagents, samples, and analytes in association with the magnetic beads that are used in assays and procedures that employ the DMF device and instrument. The magnet control module is particularly useful in the capture, confinement and release magnetic beads in a droplet or a liquid reservoir on a DMF device.

Figure 4A:
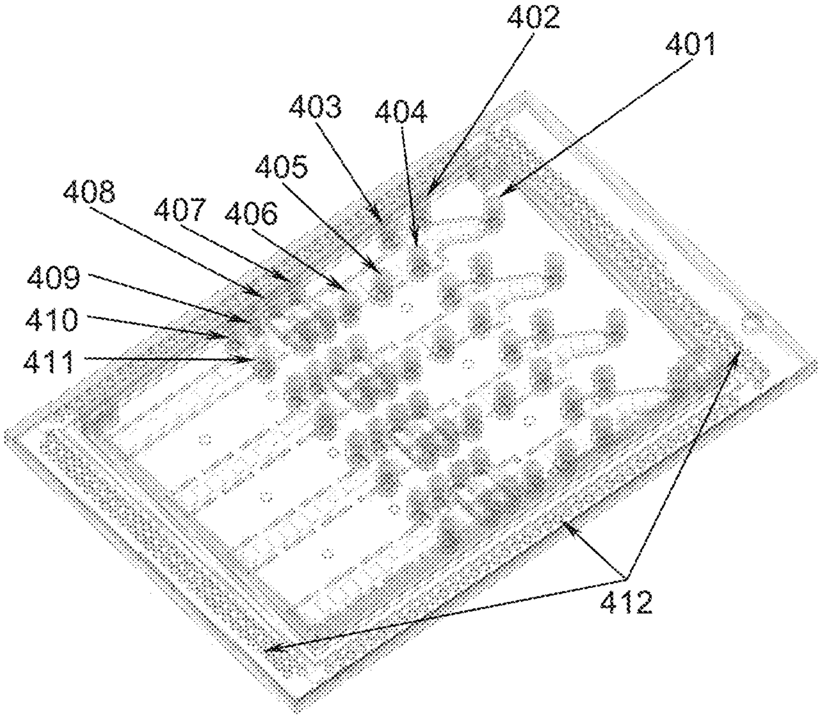
FIG. 4A shows an example DMF device used for this invention.
Figure 4B:
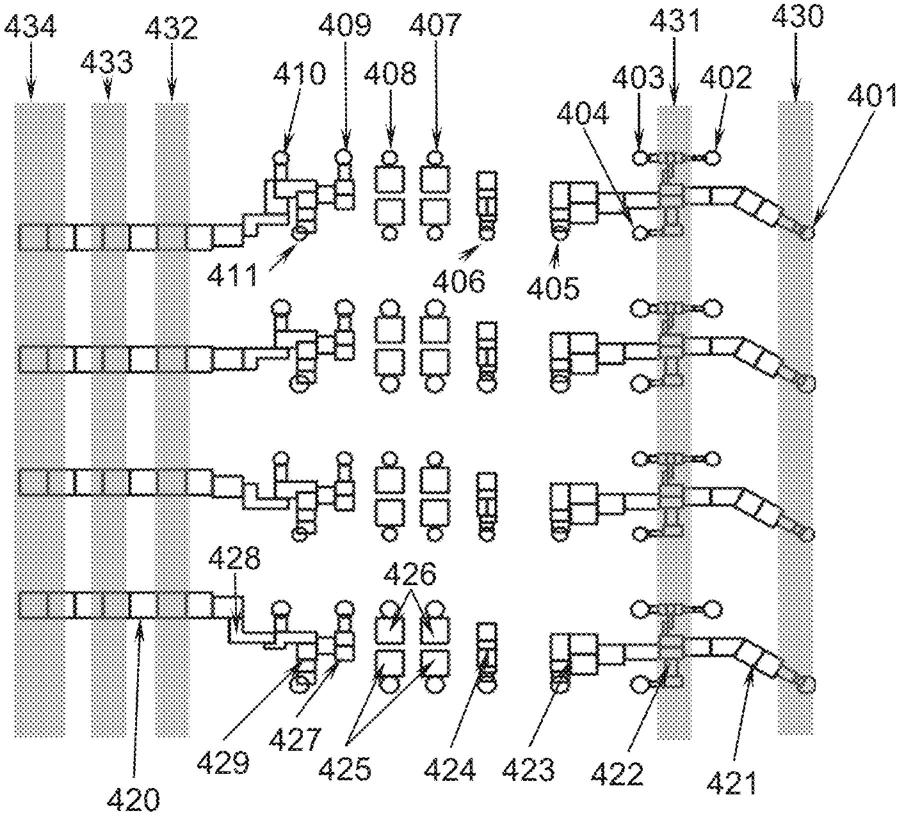
FIG. 4B shows the top view of the device shown in FIG. 4A with just the droplet control electrodes and liquid loading/unloading ports, along with the positions of 5 temperature control modules.

In FIG. 3A, 4 magnets are used to manipulate the magnetic beads in the four paths (channels) on a device (e.g., shown in FIGS. 4A and 4B). As the throughput requirement increases, so does the number of paths (channels) on a device, and hence the number of magnets in a magnet control module. The footprint of a microfluidic device generally does not grow to be significantly bigger than that of a microplate recommended by the Society for Biomolecular Screening (SBS), which has the length of 127.76 mm and width of 85.48 mm. Regardless, more magnets in a magnet control module means the spacing between the adjacent magnets will get smaller. To prevent the magnetic force from one magnet from affecting the magnetic beads in the neighboring paths (channels), certain magnet shielding might be needed.

A permanent magnet produces a constant magnetic field. In the case of an electromagnet, the magnetic field is induced by an electrical current. The shield comprises materials that distort or direct the magnetic field. Typically, the shield comprises materials with a higher permeability to magnetic fields than air, resulting in the magnetic field lines traveling the path of least resistance through the higher permeability shield material, leaving less magnetic field in the surrounding air. The material for the shield can be comprised of nickel, iron, steel, or alloys thereof.

Figure 3D:
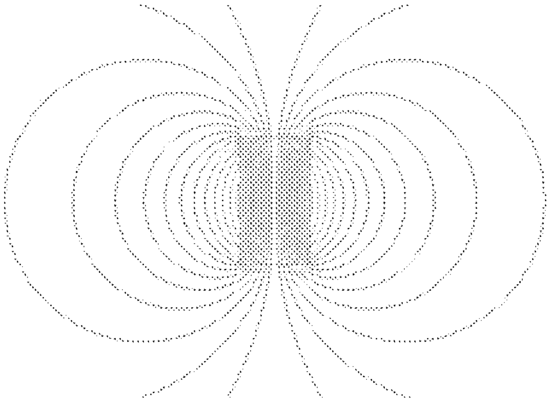
FIGS. 3D and 3E show the magnetic field distributions of a cylindrical magnet with and without shielding, respectively.
Figure 3E:
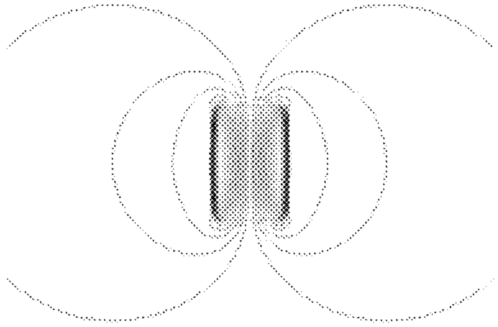
Figure 3F:
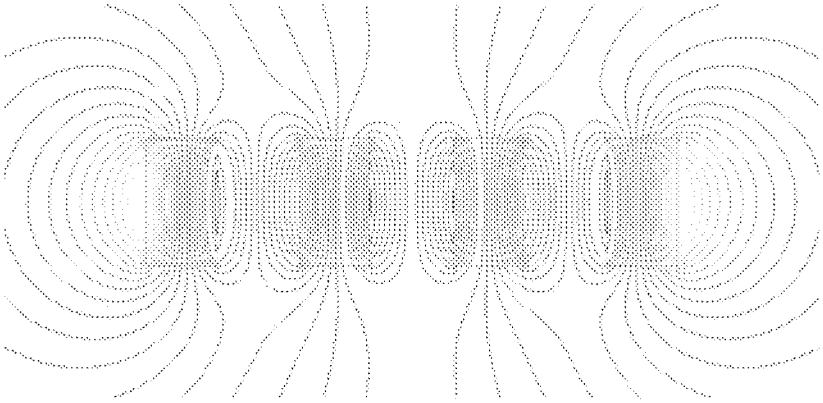
FIGS. 3F and 3G show the magnetic field distributions of a set of four cylindrical magnets with and without shielding, respectively.
Figure 3G:
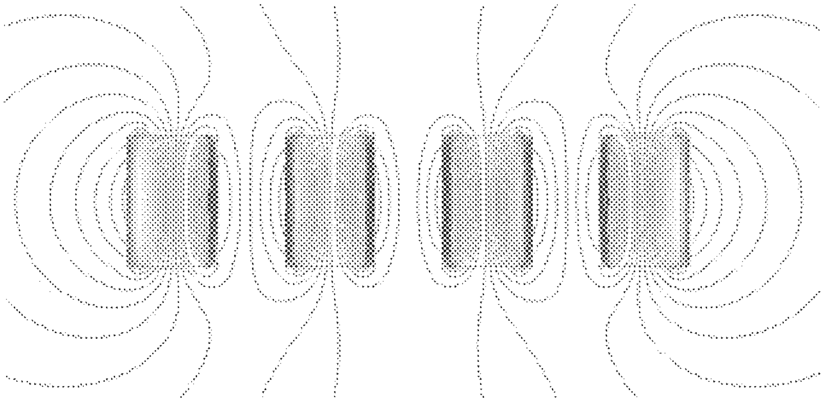

FIG. 3D shows the magnetic field distribution of a cylindrical neodymium magnet (with 8.3 mm diameter, and 15 mm height), and FIG. 3E shows the magnetic field distribution of the magnet (in FIG. 3D) with a 1 mm steel (Carbon Steel 1008) tightly wrapped around it. FIG. 3F shows the magnetic field distribution of a set of four cylindrical neodymium magnets (same as in FIG. 3D), and FIG. 3G shows the magnetic field distribution of the set of magnets (in FIG. 3E) with a 1 mm steel (Carbon Steel 1008) tightly wrapped around them individually. The spacing between adjacent magnets is 18 mm in FIGS. 3F and 3G. It should be pointed out that simulations in FIG. 3D to 3G are not for detailed implementation, but for illustration to show the effect of magnetic shielding. FIG. 3G shows a more localized magnetic field distribution compared to FIG. 3F, due to the shielding.

In one embodiment, the magnets and shields are configured such that the magnetic field is distorted, with field lines substantially focused and compressed within the shield, with other field lines radiating above and away from the shield and returning to the opposite pole. Accordingly, in some embodiments, the shielded magnet can be positioned by the instrument such that the maximum intensity of the magnetic field force can be focused within a region of the DMF device when placed in the functional position and can also be retracted to substantially remove the influence of the magnetic field on the device.

In some embodiments, the magnets of the magnet control module can moved from a distant position into a functional position, or capture position, in close proximity to a region. In one embodiment, the magnet control module is configured to move the magnets to a functional position that provides a focused magnetic field, or flux. In another embodiment, the magnet control module is configured to move the magnets to a location that substantially removes the focused magnetic field, or flux, from the functional positions of the DMF device. In another embodiment, the magnet control module is configured to move the magnets to variable positions in relation to the device, as required by the assay.

FIGS. 4A and 4B are a top view and side view of a DMF device designed for library preparation for NGS. The device has four paths (channels) capable of processing up to 4 sample simultaneously. 401-411 are 11 sets of ports for loading/adding liquids to or unloading/retrieving liquids from the device. There are through-holes (412) around the four edges of the top substrate. These through-holes allow pogo pins to make contacts with the bottom substrates to provide control voltage signals to the droplet control electrodes. Different liquids, such as samples, magnetic beads solution, PCR mix, elution solution, ethanol, etc., can be added/loaded or retrieved/unloaded from the ports. The 5 vertical elongated rectangles, 430-434, in FIG. 4B are temperature control elements of a temperature control module capable of regulating 5 different regions of the device to specified temperatures, which can be time dependent. Droplet control electrodes in regions 420-429, in different functional segments, are used for droplet operations.

As discussed herein, a DMF device typically consists of a bottom substrate and a top substrate separated by a spacer. The gap between the substrates is the space where droplets are operated. The gap can be different at different locations. At sample/reagent loading/unloading port/well places, bigger volume of liquid might be needed as reservoir for providing liquid for reactions or used for bead washing/cleaning. Hence, the gap can be as big as 20 mm (millimeter), or 10 mm, or 5 mm, or 2 mm. In other places on the DMF device, the gap is typically smaller, from 10 um (micrometer) to 1 mm, or from 50 um to 600 um, or from 100 um to 400 um. The loading/unloading ports are fabricated as part of the top substrate. The droplet control electrodes are fabricated on the bottom substrate of the device. A spacer is a layer of material (rigid) inserted between the top and the bottom substrates. It can also be a layer of projections from the top (or bottom) substrate, especially when injection molded top (or bottom) substrate is made.

The DMF device shown in FIGS. 4A and 4B is a representative one for production. It has repeating functional units, such as loading/unloading ports and droplet control electrodes, for simultaneously handling multiple similar assays.

In FIGS. 4A and 4B, the droplet control electrodes are not contiguous. This means droplets cannot be moved between some of the electrodes regions by electrostatic forces. For example, a droplet cannot be move from the 423 regions to the 424 regions by electrowetting effect. This is by design, as only magnetic beads in the droplet will be moved (by magnets) from the 423 regions to the 424 regions.

Next-generation sequencing (NGS), also referred to as High-throughput sequencing, has revolutionized genomic studies, especially with costs dropping and the number of sequencing applications increasing dramatically in recent years. To prepare high quality NGS libraries from DNA or RNA sources in a fast and cost-effective way is becoming increasingly important.

The purpose of NGS library preparation is to construct quality DNA/RNA material for sequencing. Since there are many steps involved, manual NGS library preparation can be error-prone. Automated NGS library preparation using a liquid handler is typically associated with high equipment cost, reagent cost, and maintenance cost. This disclosure presents an alternative—an automated library preparation based on digital microfluidics technology. After a user loads in the samples and reagents, all the reactions and bead cleaning steps take place on a DMF device operated by a special designed instrument. So, user errors can be greatly reduced. Reagent cost can be significantly lowered too, as 1/10, and even 1/20 of the bulk volume (currently needed by a liquid handler) has been verified. The following is one embodiment of a list of steps of carrying out library preparation on a DMF device.

1. Samples/Reagents Loading
   - Load 1 to 4 adapter ligation reagent(s) to the DMF device through 1 to 4 of ports 401 and keep it (them) on the electrode(s) above temperature control module 430 which is set at 4° C. The volume is about 2.5 uL (microliter) each.
   - Load 1 to 4 End Repair (ER) and A-Tailing (AT) reagent(s) to the device through 1 to 4 of ports 402. The volume is about 0.5 uL each.
   - Load 1 to 4 fragmentation mix(es) to the device through 1 to 4 of ports 403. The volume is about 0.75 uL each.
   - Load 1 to 4 genomic DNA sample(s) to the device through 1 to 4 of ports 404. The volume is about 1.75 uL each.
   - Load 1 to 4 magnetic bead solution(s) to the device through 1 to 4 of ports 405 (for after Adaptor ligation clean-up). The volume is about 4.4 uL each.
   - Load 1 to 4 droplets of ddH2O (double-distilled water) to the device through 1 to 4 of ports 406 (for elution). The volume is about 2.5 uL each.
   - Load 1 to 2 ethanol to each of the two 407 ports and each of the two 408 ports (for magnetic bead clean-up). The volume is about 20 uL each.
   - Load 1 to 4 ddH2O (double-distilled water) to the device through 1 to 4 of ports 409 (for elution). The volume is about 2.75 uL each.
   - Load 1 to 4 PCR mix(es) to the device through 1 to 4 of ports 410 (for amplification). The volume is about 2.25 uL each.
   - Load 1 to 4 bead solution(s) to the device through 1 to 4 of ports 411 (for after PCR clean-up). The volume is about 5 uL each.
2. Set temperature control element 431 to 37° C. Move the sample droplet(s) and the fragmentation mix droplet(s) to the electrode area(s) 422 (right above the temperature control element 431) for merging/mixing and for 30 minutes enzymatic fragmentation.
3. Set temperature control element 431 to 65° C. Move ER/AT reagent droplet(s) to the electrode area(s) 422 to merge with the droplet there and keep the merged droplet there for 30 minutes for ER/AT reactions.
4. Set temperature control element 431 to 20° C. Move Adapter ligation reagent droplet(s) to the electrode area(s) 422 to merge with the droplet there and keep the merged droplet there for 15 minutes for Adapter ligation reaction(s).
5. Move the droplet (after step 5) to the electrode area(s) 423 to merge with the beads solution there. The 423 electrodes can be activated according a prefer sequence to assist the mixing of merged droplets.
6. Bring magnets to make contacts with the DMF device at electrode areas 423. After 2 minutes (the magnetic beads will group together), move the grouped magnetic beads to the electrode area(s) 425, and move back and forth 5 times on these electrodes to perform beads cleaning.
7. Move the beads (using the magnets) to mix with the ddH2O at electrode area(s) 427. Move the magnets away from the DMF device. Move the ddH2O back and forth along electrodes 427 to help resuspending the beads in ddH2O droplet. Bring the magnets to make contacts with the DMF device at electrode area(s) 427 again to regroup the magnetic beads.
8. While keeping the magnets still, move the ddH2O (with DNA) droplet(s) and the PCR mix droplets to electrode area(s) 428 to merge and mix. Then move the magnets away from the DMF device.

9. Set temperature control elements 432, 433 and 434 to 60° C., 72° C. and 98° C., respectively. Move the merged droplet(s) back and forth (e.g., 5-15 times) in these three temperature zones for PCR amplification.
10. Move the droplet to electrode area(s) 429 to merge with the magnetic bead solution there.
11. Move the magnets to align with electrode area(s) 429 while still away from the DMF device. Bring the magnets to make contacts with the device to group the magnetic beads.
12. Move the magnetic beads to electrode areas 426. Move the beads back and forth along these electrodes for bead clean up.
13. Move the magnetic beads to electrode areas 424. Move the magnet(s) away from the device to suspend the beads in the ddH2O.
14. Move the magnets close to electrode areas 424 to immobilize the beads. Aspirate the supernatant from ports 406.

In some embodiments of the above-mentioned experiment description:

Electrostatic effect (such as electrowetting) is utilized to move the droplets;

The loading of the sample/reagents and the unloading of the supernatant can be done manually, or by a liquid handing workstation. All other steps, such as droplet transports, magnet operations, temperature regulations, etc., are all performed in an automated fashion by a microcontroller in the apparatus.

Beads suspending can be better achieved by certain droplet motions.

Further, the steps presented above are for illustration only and should not be considered as limitation.

As used herein, the term "fragmentation" means to fragment and/or size the target DNA/RNA sequences to an optimal length range desired by the downstream platform; the term "End Repair or ER" means to ensure each DNA molecule is free from overhangs, and contains 5 prime phosphate and 3 prime hydroxyl groups; the term "A-tailing or AT" means to add a non-templated nucleotide to the 3 prime end of a blunt double-stranded DNA molecule; the term "Adapter Ligation" means to attach/anneal oligonucleotide adapters to the ends of the DNA target fragments; the terms "Bead clean-up" means to remove unwanted particles such as excess adapter dimers; the term "Amplification" means to increase the amount DNA target fragments. Fragmentation can be done mechanically or enzymatically. Enzymatic fragmentation is chosen here as it is easier to perform on a DMF device.

In this design, the electrodes are not always next to each other. There can be big gaps between adjacent electrodes in the same sample path (channel). This adds a lot design flexibility, especially the routing of the control signals, which is highly desired in a complex DMF device design.

Figure 5:
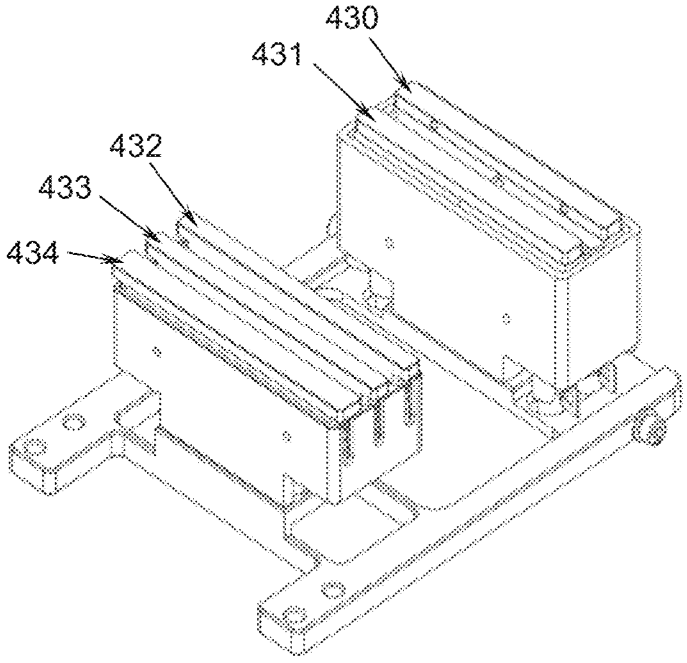
FIG. 5 shows an example of a temperature control module with 5 independent temperature regulators capable of controlling a DMF to the temperature distribution of 5 specified temperature zones.

FIG. 5 is a preferred embodiment of the temperature control module used in FIGS. 4A and 4B. FIG. 5 shows the temperature control module with 5 independently controlled temperature control elements 430-434. Each of the 5 temperature control elements can be used to form a thermal interface with a defined zone on the bottom side of the DMF device for proper operation of the chemical/biochemical reactions that occur in the droplets/liquids on the DMF device during an assay. The temperature control elements, although the invention is not limited to this configuration, may be spring-mounted and are urged upward in opposition to the downward pressure of the clamping mechanism so as to establish high thermal diffusivity contact zone for efficient heat transfer.

A temperature control element comprises one or more temperature regulators. A temperature regulator can be any device that regulates temperature. This includes, but not limited to, resistive heaters, TEC (thermoelectric controller) or Peltier devices, IR heat sources, circulating liquids or gases in a contained mechanism, and microwave heating, etc. The temperature regulator may further comprise one or more cooling fans located under the temperature regulator(s) to cool the device by forcing air across the elements and means for venting the air out of the instrument/apparatus, taking the unwanted heat with it. A temperature control element can comprise one or more temperature sensors, e.g., thermistors, thermocouples, RTD (Resistive Temperature Detector), etc., so that a closed-loop temperature control can be performed.

A temperature regulator generally does not directly contact the heat transfer surfaces or the DMF device surface, but through a heat transfer layer. In one embodiment, a temperature regulator is located in a recessed or slotted portion of a platen or conductive heat spreader. The platen or heat spreader can be comprised of a metal that has a high thermal conductivity but low thermal capacity such as, but not limited to, brass, aluminum alloy, nichrome, steel, etc. The temperature sensor(s) are typically attached/embedded in the platen or heat spreader.

The use of a regulator and temperature sensor(s) allows the control of the temperature change rate as well as the temperature setpoint. For example, the rate of temperature change can be more than 1° C. per second, more than 2° C. per second, more than 5° C. per second, etc. The temperature setpoint can be from −20 to 200° C., from −10 to 150° C., from 0 to 120° C., or from 4 to 100° C., etc.

The thermal contact between a region of a DMF device and a temperature control element provides temperature regulation of the region and the droplet(s)/fluid(s) contained therein, for example, for incubation and/or chemical/biochemical reactions. In some embodiments, it is used for enzymatic reaction, PCR, etc.

Figure 6:
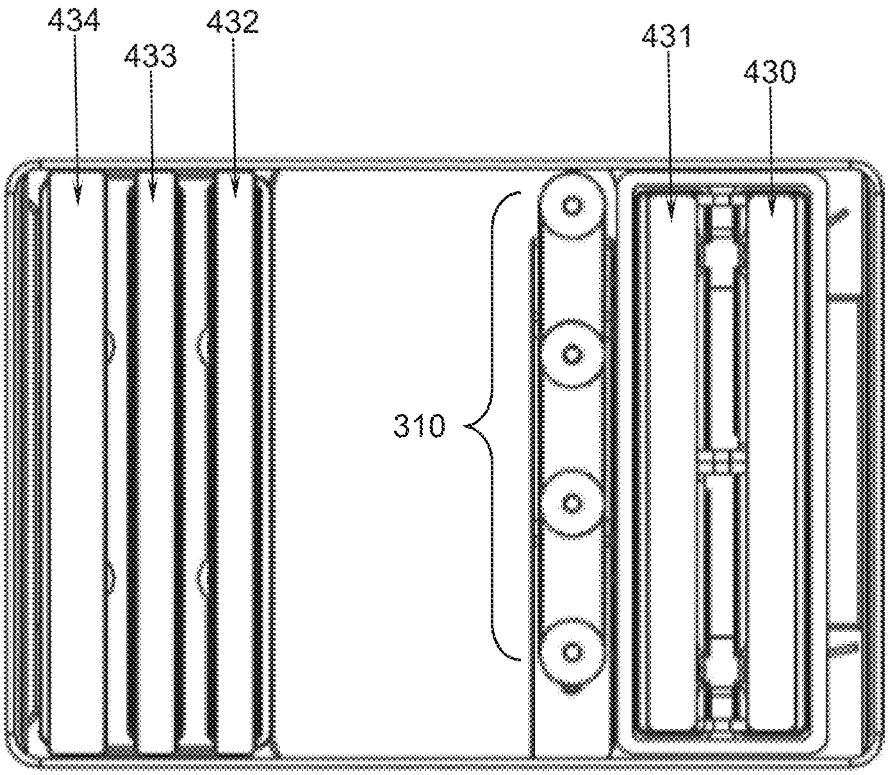
FIG. 6 is the top view of the set of five temperature control modules with a set of 4 magnets (part of magnet control module).

FIG. 6 shows both the temperature control module and magnet control module in one operational configuration. From FIG. 6, it is apparent that when the temperature control elements are physically close to the DMF device, the motion range of the magnets is limited. This is even more so when other modules (such as the optical detection and/or detection module) are in use. Since not all the functional modules are required at the same time during an experiment, some modules can be moved out of the way so that other modules can have more space to move around, when needed. In the NGS library preparation example described above, the temperature control elements and the magnets are generally not needed at the same time. So, in one embodiment, the apparatus is designed in such a way that one or more of the temperature control elements are moved away from the DMF device when temperature control is not needed at that time, so that the magnets can be moved in close proximity to any location of the DMF device. The temperature control elements can be moved close to the DMF device when the magnets are not in motion (and not at the intended positions for the temperature controller elements) or when intended positions are not in way of the temperature control element(s). In another embodiment, the magnets, when not in use, can be moved to an end of the DMF device to allow other modules such as the temperature control elements to be moved close to (or to make contacts to) the device. In yet another embodiment, the magnets can be kept in the space(s) between the other modules so that some or all of the other modules can be moved close to (or to make contacts to) the device.

Figure 7A:
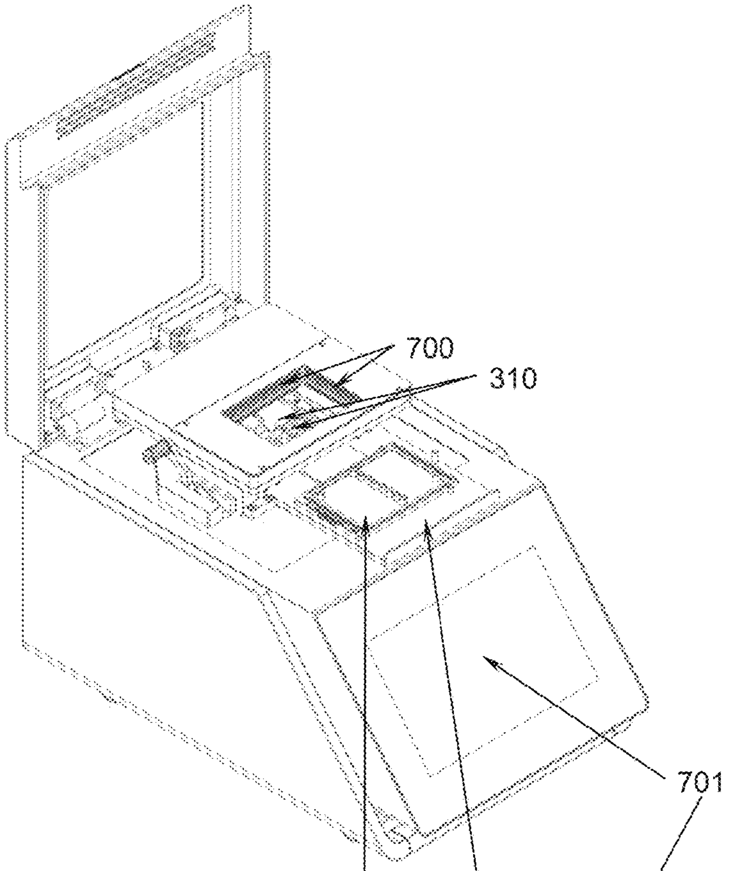
FIGS. 7A, 7B and 7C present a preferred embodiment of the apparatus of the invention.
Figure 7B:
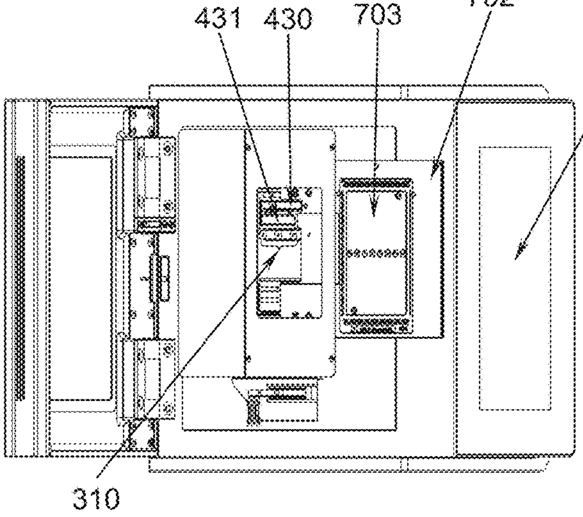
Figure 7C:
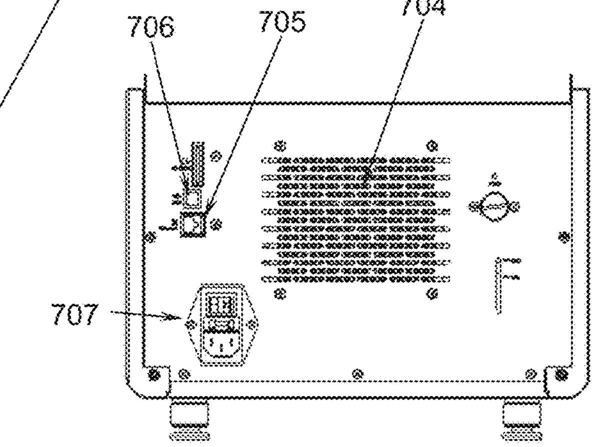

FIGS. 7A, 7B and 7C show a preferred embodiment of the apparatus (instrument and device). FIG. 7A is the top-front-side view of the apparatus, FIG. 7B is the top view, and FIG. 7C is the rear view. 700 are pogo pins which can make contacts with a DMF device for the instrument to provide droplet control signals supplied by a voltage control module (not shown). 701 is a touch screen to provide a graphical user interface for a user to enter commands and for displaying help, experiment status and/or results, etc. 702 is a slidable docking tray for loading/unloading a DMF device when extended. When pushed in, the pogo pins 700, the magnets 310, and/or the temperature control elements 430 and 431, etc., can make contacts with the bottom substrate of the device. 703 is a DMF device. 704 is a vent (with a cooling fan inside) for dissipating the heat generated inside the instrument. 705 is a USB port, and 706 is an ethernet port. They provide ways for an application software running on a computer to communicate (e.g., sending commands, or receiving data) with the apparatus. 707 is an AC power port. In some embodiments, an optical excitation and/or detection module can be incorporated for the optical measurement, such as fluorescence, chemiluminescence, transmission, and absorption, etc. Also, a capacitance measurement module can in incorporated to measure the position and/or volume information of the droplets.

In one embodiment, the temperature control elements can be moved (vertically) away from the DMF device to allow more range for magnets to move around the device. In another embodiment, the optical modules and/or the temperature control module can be moved (vertically) away from the DMF device to allow more movement range for the magnets. In another embodiment, the optical modules and/or the temperature control module can be moved (horizontally) to one end of the DMF device to allow more movement range for the magnets. In yet another embodiment, the magnets can be stopped at specified space(s) so that the optical modules and/or the temperature control module can be moved vertically to close proximity to the DMF device.

Figure 8:
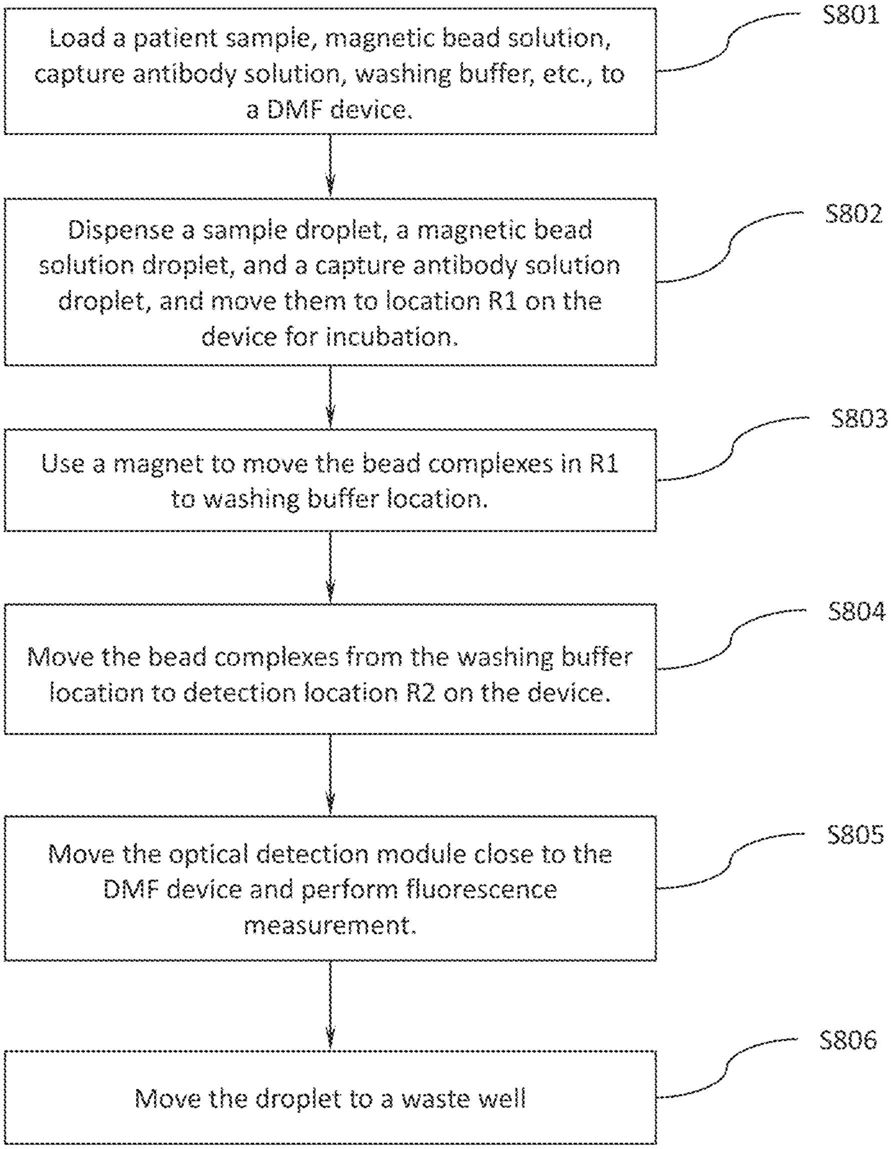
FIG. 8 illustrates a procedure of a magnetic bead-based fluorescent immunoassay implemented using this apparatus.
Figure 9:
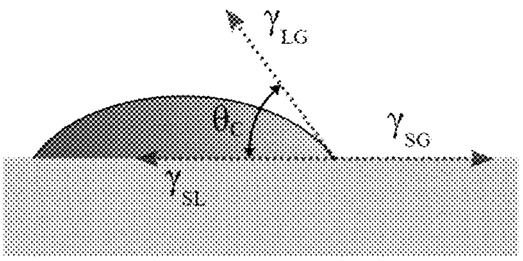
FIG. 9 illustrates a schematic of a liquid droplet showing the quantities in the Young-Laplace equation.

FIG. 8 shows a magnetic bead based procedure for rapid purification and detection of influenza viral particles from a clinical serum sample. Target influenza viral particles in the sample are first captured by the antibody-conjugated magnetic beads, followed by isolating the viral particles from the sample using a magnet. Then, capture antibodies labeled with fluorescent dyes are used to bind the surface antigen of the virus-bound magnet complexes. Finally, the fluorescent labeled magnetic complexes get detected using an optical detection module.

Immunoassays are widely used for the identification and/or quantification of many clinical analytes. The high binding affinities and the specificity of analyte recognition demonstrated by antibodies greatly simplify the accurate determination of analytes, despite the presence of many other substances in the sample. Fluorescent immunoassay is an immunoassay technique in which the antigen or antibody is labeled with a fluorescent dye for the purpose of detecting and/or quantifying another antigen or antibody. With magnetic beads serving as the solid phase for separation of the analyte from the sample, faster sample-to-result turn-around time can be achieved.

Influenza, commonly known as "the flu," is an infectious disease caused by an influenza virus. It mainly affects the upper respiratory tract and can sometimes be very serious. The three devastating influenza pandemics occurred in the twentieth century showed that it can be deadly. Presented here is a cost effective, easy to use, and fast turn-around method for the diagnostics of influenza.

FIG. 8 shows an example of performing a fluorescent immunoassay on a DMF device. Specifically, it shows a sandwich-like magnetic bead based fluorescent immunoassay for rapid detection of influenza virus.

In Step S801, a DMF device is loading with a patient serum sample, magnetic bead (coated with primary antibodies) solution, capture antibody solution, and washing buffer, ddH2O (double-distilled water), etc., at different ports/wells. The magnetic beads are coated with primary antibodies designed to bind/capture the influenza antigens. The capture antibody solution contains secondary antibodies labeled with fluorescent dyes. The capture antibodies can also bind to the influenza antigens. The basic principle is that a magnetic bead, a primary antibody, an influenza antigen, and a capture antibody form a complex which can be detected optically. The complex can be moved to different location (using magnets) on the DMF device for washing and measurement, etc.

S802, a droplet is dispensed from the sample port/well, a droplet is dispensed from the magnetic bead solution port/well, and a droplet is dispensed from the capture antibody solution port/well. Move the three droplets to a reaction location R1, where they merge, mix, and incubate. Depending on the reaction volume, the incubation time can be up to 10 hours, or 5 hours, or 2 hours, or 1 hour, or 30 minutes, or 15 minutes. After sufficient incubation, magnetic bead/primary antibody/influenza antigen/capture antibody complexes will form.

It is possible that the magnetic bead solution and the capture antibody solution can be combined and loaded into one port/well. This reduces the number of ports/wells needed on the DMF device. It also reduces the number of droplet operations.

S803, bring a magnet close to the R1 location and move the bead complexes to a washing buffer location (well, port, or reservoir). Move the magnetic beads around (using the magnet) inside the washing buffer helps washing off the unbound antigens more thoroughly. Step 803 can be repeated (to different washing buffer locations) if needed.

S804, dispense a ddH2O droplet and move it to detection location R2, and move the complexes (using the magnet) to detection location R2. Move the magnet away from the device so that the beads will disperse in the ddH2O droplet. The droplet can be moved back and forth in the neighboring electrodes to assist the dispersing of the beads.

S805, if needed, move the optical detection module close to the DMF device, and perform fluorescence measurement.

S806, after detection, move the droplet to a waste well.

Steps S802 to S806 can be repeated for multiple reactions and measurements of the same sample.

In some embodiments, the reagents can be packaged on a DMF device, and a user only need to load sample(s). This makes the apparatus even easier to operate and reduces the chance for the tests to be contaminated (or cross contaminated).

In some embodiments, temperature control at different reaction locations can be regulated by using thermal controllers in the apparatus/instrument.

In some embodiments, the above described examples and the above-mentioned advantages are for the purposes of illustration, and by no means to be exhaustive.

While the preferred embodiments of the invention have been illustrated and described, it will be appreciated that various changes can be made therein without departing from the spirit and scope of the invention.

The above described embodiments are only used to illustrate the principles and their effects of this invention and are not used to limit the scope of the invention. For people who are familiar with this technical field, various modifications and changes can be made without violating the spirit and scope of the invention. So, all modifications and changes without departing from the spirit and technical guidelines by anyone with common knowledge in this technical field are still covered by the current invention.

The invention claimed is:

1. A method for performing NGS library preparation on a digital microfluidic (DMF) device, comprising:

a) loading a sample, a magnetic bead solution, a washing buffer, an elution buffer, an Adapter ligation reagent, an ER/AT (End Repair and A-Tailing) reagent, a fragmentation reagent, and a PCR reagent into a sample reservoir on the DMF device;

b) dispensing a sample droplet from the sample reservoir and moving it to an electrode area on the DMF device;

c) dispensing a fragmentation reagent droplet and merging it with the sample droplet for enzymatic fragmentation reactions at the electrode area on the DMF device;

d) dispensing an ER/AT reagent droplet and merging it with a mixed sample droplet in b) or c) for the ER/AT reactions at the electrode area on the DMF device;

e) dispensing an Adapter ligation reagent droplet and merging it with a mixed sample droplet in d) for the Adapter ligation reactions at the electrode area on the DMF device;

f) dispensing a magnet bead droplet and merging it with a mixed sample droplet in e) at the electrode area on the DMF device for DNA/RNA capturing;

g) using a magnetic field to focus the magnet beads in a mixed sample droplet in f) and move the focused magnet beads to a washing buffer reservoir;

h) releasing the magnetic field and letting the magnet beads disperse in the washing buffer reservoir;

i) applying a second magnetic field to focus the magnet beads in the washing buffer reservoir;

j) using the second magnetic field to move the focused magnet beads to an elution buffer reservoir;

k) releasing the second magnetic field and letting the magnet beads disperse in a fourth reagent reservoir;

l) applying another magnetic field to focus the magnet beads in the fourth reagent reservoir;

m) using the other magnetic field to move the focused magnet beads to the electrode area on the DMF device;

n) dispensing a droplet from the elution buffer reservoir for further processing;

o) an apparatus comprising:

i. a voltage control module to provide electric signals to the DMF device for the manipulation of the liquids/droplets on the DMF device; and ii. a magnet control module to move at least one magnet in at least two directions vertically and horizontally.

2. The method of claim 1, wherein the washing buffer comprises ethanol.

3. The method of claim 1, wherein the elution buffer comprises double-distilled water.

4. The method of claim 1, wherein the electrode area is controlled to temperature setpoints.

5. The method of claim 1, wherein the further processing comprises PCR amplification.

6. The method of claim 5, wherein the PCR amplification is performed by shuttling the reaction droplet between temperature zones on the DMF device.

7. The method of claim 1, wherein the at least one magnet is vertically moved close to the DMF device to produce a magnetic field strong enough to transport the magnetic beads to a different location on the DMF device.

8. The method of claim 7, wherein the at least one magnet is vertically moved to make physical contact with the DMF device.

9. The method of claim 1, wherein the at least one magnet is vertically moved away from the DMF device far enough so that the magnetic field at the DMF device is zero or insignificant.

10. The method of claim 1, wherein one of the at least one magnet is a focusing magnet.

11. The method of claim 1, wherein the apparatus further comprises a temperature control module to control at least one region on the DMF device to a temperature.

12. The method of claim 11, wherein the temperature is between −20° C. to 200° C.

13. The method of claim 11, wherein the temperature is between 0° C. to 120° C.

14. The method of claim 11, wherein the temperature control module is moved vertically.

15. The method of claim 1, wherein the apparatus further comprises at least one optical detection module for performing optical measurements from at least one location on the DMF device.

16. The method of claim 15, wherein the optical detection module is moved vertically.

17. The method of claim 16, wherein the optical detection module is also moved horizontally.

18. The method of claim 1, wherein the apparatus further comprises an electronic module that measures the position and volume information of a droplet by measuring the capacitance from the related electrodes on the DMF device.

19. The method of claim 18, wherein the droplet's volume and position information are used to control the droplet.

* * * * *